United States Patent
Wang et al.

(10) Patent No.: US 12,101,833 B2
(45) Date of Patent: Sep. 24, 2024

(54) SECONDARY CELL ACTIVATION METHOD AND APPARATUS

(71) Applicant: HUAWEI TECHNOLOGIES CO., LTD., Guangdong (CN)

(72) Inventors: Xiaona Wang, Chengdu (CN); Peng Guan, Chengdu (CN); Jiehua Xiao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 294 days.

(21) Appl. No.: 17/510,202

(22) Filed: Oct. 25, 2021

(65) Prior Publication Data
US 2022/0046735 A1 Feb. 10, 2022

Related U.S. Application Data

(63) Continuation of application No. PCT/CN2020/081408, filed on Mar. 26, 2020.

(30) Foreign Application Priority Data

Apr. 25, 2019 (CN) .......................... 201910340706.5

(51) Int. Cl.
*H04W 76/15* (2018.01)
*H04W 24/10* (2009.01)
*H04W 72/04* (2023.01)

(52) U.S. Cl.
CPC ........... *H04W 76/15* (2018.02); *H04W 24/10* (2013.01); *H04W 72/04* (2013.01)

(58) Field of Classification Search
CPC ...... H04W 76/15; H04W 24/10; H04W 72/04
See application file for complete search history.

(56) References Cited

U.S. PATENT DOCUMENTS

2016/0278073 A1\* 9/2016 Dinan ................... H04L 5/001
2019/0089507 A1 3/2019 Dinan
(Continued)

FOREIGN PATENT DOCUMENTS

CN 102083213 A 6/2011
CN 102624494 A 8/2012
(Continued)

OTHER PUBLICATIONS

Intel Corporation, Handling of CSI for SCell activation in euCA. 3GPP TSG-RAN WG2 Meeting #101, Athens, Greece, Feb. 26-Mar. 2, 2018, R2-1802911, 3 pages.
(Continued)

*Primary Examiner* — Duc C Ho
(74) *Attorney, Agent, or Firm* — HUAWEI TECHNOLOGIES CO., LTD.

(57) ABSTRACT

This application discloses a secondary cell activation method and an apparatus, and relates to the communication field, so that a terminal device can report a channel state information measurement result in a secondary cell activation phase to a network device. The secondary cell activation method includes: A terminal device receives first indication information, where the first indication information is used to indicate an uplink resource for reporting a channel state information measurement result in a secondary cell activation phase; and the terminal device sends the channel state information measurement result to a network device based on the first indication information.

16 Claims, 12 Drawing Sheets

(56) References Cited

U.S. PATENT DOCUMENTS

| | | | | |
|---|---|---|---|---|
| 2019/0150172 | A1* | 5/2019 | Ang | H04W 72/1268 370/329 |
| 2020/0366450 | A1* | 11/2020 | Kazmi | H04W 76/30 |

FOREIGN PATENT DOCUMENTS

| | | | |
|---|---|---|---|
| CN | 107534538 A | | 1/2018 |
| CN | 109391986 A | | 2/2019 |
| EP | 3454477 A1 | | 3/2019 |
| WO | WO-2019029330 A1 | * | 2/2019 ............... H04L 5/00 |

OTHER PUBLICATIONS

Ericsson et al., CSI Reporting in SCell Activation Requirements. 3GPP TSG-RAN4 Meeting #70, Prague, Czech Republic, Feb. 10-14, 2014, R4-141055, 4 pages.

3GPP TS 38.331 V15.5.1 (Apr. 2019), 3rd Generation Partnership Project; Technical Specification Group Radio Access Network; NR; Radio Resource Control (RRC) protocol specification(Release 15), 491 pages.

3GPP TS 38.211 V15.5.0 (Mar. 2019), 3rd Generation Partnership Project; Technical Specification Group Radio Access Network; NR; Physical channels and modulation(Release 15), 96 pages.

3GPP TS 38.212 V15.5.0 (Mar. 2019), 3rd Generation Partnership Project; Technical Specification Group Radio Access Network; NR; Multiplexing and channel coding(Release 15), 101 pages.

3GPP TS 38.213 V15.5.0 (Mar. 2019), 3rd Generation Partnership Project; Technical Specification Group Radio Access Network; NR; Physical layer procedures for control(Release 15), 104 pages.

CATT: "Update to test cases for SCell activation/deactivation in SA",3GPP Draft; R4-1904862, Apr. 15, 2019, total 10 pages.

CATT: "Further discussion on SCell activation and deactivation requirements", 3GPP Draft; R4-1900471, Feb. 15, 2019, total 4 pages.

* cited by examiner

SECONDARY CELL ACTIVATION METHOD AND APPARATUS

CROSS-REFERENCE TO RELATED APPLICATIONS

This application is a continuation of International Application No. PCT/CN2020/081408, filed on Mar. 26, 2020, which claims priority to Chinese Patent Application No. 201910340706.5, filed on Apr. 25, 2019. The disclosures of the aforementioned applications are hereby incorporated by reference in their entireties.

TECHNICAL FIELD

This application relates to the communication field, and in particular, to a secondary cell activation method and an apparatus.

BACKGROUND

In a 5th generation (5G) communication standard, two frequency bands are supported: a low frequency band (FR1 for short, 450 MHz to 6000 MHz) and a high frequency band (FR2 for short, 24250 MHz to 52600 MHz). An analog beam of the FR2 frequency band transmitted by a network device by using a high-frequency antenna array is relatively narrow, and attenuation of a high-frequency signal is usually canceled through beamforming. An analog beam of the FR1 frequency band transmitted by the network device by using a low-frequency antenna array is relatively wide.

To satisfy requirements on an increased single-user peak rate and a higher system capacity, a bandwidth may be increased through carrier aggregation (CA). The network device performs data communication with a terminal device by using cells in two frequency bands, where a cell in the FR1 frequency band is generally used as a primary cell (PCell), and a cell in the FR2 frequency band is generally used as a secondary cell (SCell), that is, communication is performed in the secondary cell by using a relatively narrow beam.

When activating the secondary cell, after implementing downlink time-frequency domain synchronization of the secondary cell, the terminal device implements channel state information (CSI) measurement based on a valid channel state information reference signal (CSI-RS) resource configured by the network device, and obtains a CSI measurement result of the secondary cell. How the terminal device reports a channel state information measurement result in a secondary cell activation phase to the network device is not specified in a current technology.

SUMMARY

Embodiments of this application provide a secondary cell activation method and an apparatus, so that a terminal device can report a channel state information measurement result in a secondary cell activation phase to a network device.

To achieve the foregoing objective, the following technical solutions are used in the embodiments of this application.

According to a first aspect, a secondary cell activation method is provided. The method includes: A terminal device receives first indication information, where the first indication information is used to indicate an uplink resource for reporting a channel state information measurement result in a secondary cell activation phase; and the terminal device sends the channel state information measurement result to a network device based on the first indication information.

In a possible implementation, the channel state information measurement result includes at least one of the following information: a synchronization signal block identifier SSB-ID, a CSI-RS resource identifier CRI, a rank indicator RI, reference signal received power RSRP, reference signal received quality RSRQ, a precoding matrix indicator PMI, a channel quality indicator CQI, a signal to interference plus noise ratio SINR, a signal-to-noise ratio SNR, a current state of a secondary cell, or a secondary cell receiving capability of the terminal device. According to the secondary cell activation method provided in this embodiment of this application, the terminal device receives the first indication information, where the first indication information is used to indicate the uplink resource for reporting the channel state information measurement result in the secondary cell activation phase. The terminal device sends the channel state information measurement result to the network device based on the first indication information. The network device indicates the terminal device to report the uplink resource of the channel state information measurement result in the secondary cell activation phase, so that the terminal device can report the channel state information measurement result in the secondary cell activation phase to the network device.

In a possible implementation, the uplink resource indicated by the first indication information is an uplink resource of a primary cell and/or an uplink resource of the secondary cell. That is, the terminal device may report the channel state information measurement result by using the primary cell or by using the secondary cell.

In a possible implementation, the uplink resource indicated by the first indication information includes at least one of the following resources: a random access channel resource, an uplink data channel transmission resource, or an uplink control channel transmission resource.

In a possible implementation, the uplink resource is a periodic resource, a semi-persistent resource, or a triggered resource.

In a possible implementation, the method further includes: The terminal device obtains second indication information, where the second indication information is used to indicate a pilot resource used for channel state information measurement, and the pilot resource is a periodic resource, a semi-persistent resource, or a triggered resource. The terminal device obtains the pilot resource used for channel state information measurement, so that the terminal device can directly perform channel state information measurement on the pilot resource, to reduce a processing latency.

In a possible implementation, the method further includes: The terminal device sends a request message to the network device, where the request message is used to request to obtain the first indication information. In this manner, the network device may be triggered to send the first indication information.

In a possible implementation, an uplink resource used to carry the request message is the uplink resource of the primary cell and/or the uplink resource of the secondary cell. That is, the terminal device may report the request message by using the primary cell or by using the secondary cell.

In a possible implementation, the uplink resource used to carry the request message includes at least one of the following resources: a random access resource, a scheduling request resource, or a channel state information reporting resource of another cell.

In a possible implementation, the another cell is the primary cell or an activated secondary cell. That is, the request message may be reported by using the primary cell or the activated secondary cell.

In a possible implementation, the method further includes: The terminal device sends third indication information to the network device, where the third indication information is used to indicate a time period required for the terminal device to activate the secondary cell. In this manner, the network device may be triggered to send the first indication information.

In a possible implementation, the time period required for activating the secondary cell is determined based on the current state of the secondary cell and/or the secondary cell receiving capability of the terminal device.

In a possible implementation, the current state of the to-be-activated secondary cell of the terminal device is at least one of the following: the cell is unknown, the cell is known, the cell is synchronized in time domain, the cell is not synchronized in time domain, the cell is synchronized in frequency domain, the cell is not synchronized in frequency domain, a receive panel of the cell is known, a receive panel of the cell is unknown, a transmit panel of the cell is known, a transmit panel of the cell is unknown, a receive beam of the cell is known, a receive beam of the cell is unknown, a transmit beam of the cell is known, a transmit beam of the cell is unknown, a CSI measurement result of the cell is known, or a CSI measurement result of the cell is unknown.

In a possible implementation, the secondary cell receiving capability of the terminal device includes at least one of the following information: supporting wide beam receiving, not supporting wide beam receiving, a quantity of panels of the terminal device, a quantity of receive beams of the terminal device, a quantity of beams of a single panel of the terminal device, supporting scanning and receiving of a same synchronization signal block on different symbols by using different beams, or not supporting scanning and receiving of a same synchronization signal block on different symbols by using different beams.

According to a second aspect, a secondary cell activation method is provided. The method includes: A network device sends first indication information to a terminal device, where the first indication information is used to indicate an uplink resource for reporting a channel state information measurement result in a secondary cell activation phase; and the network device receives the channel state information measurement result from the terminal device based on the first indication information. According to the secondary cell activation method provided in this embodiment of this application, the network device indicates the terminal device to report the uplink resource of the channel state information measurement result in the secondary cell activation phase, so that the terminal device can report the channel state information measurement result in the secondary cell activation phase to the network device.

In a possible implementation, the channel state information measurement result includes at least one of the following information: a synchronization signal block identifier SSB-ID, a CSI-RS resource identifier CRI, a rank indicator RI, reference signal received power RSRP, reference signal received quality RSRQ, a precoding matrix indicator PMI, a channel quality indicator CQI, a signal to interference plus noise ratio SINR, a signal-to-noise ratio SNR, a current state of a secondary cell, or a secondary cell receiving capability of the terminal device.

In a possible implementation, the uplink resource indicated by the first indication information is an uplink resource of a primary cell and/or an uplink resource of the secondary cell. That is, the terminal device may report the channel state information measurement result by using the primary cell or by using the secondary cell.

In a possible implementation, the uplink resource indicated by the first indication information includes at least one of the following resources: a random access channel resource, an uplink data channel transmission resource, or an uplink control channel transmission resource.

In a possible implementation, the uplink resource is a periodic resource, a semi-persistent resource, or a triggered resource.

In a possible implementation, the method further includes: The network device sends second indication information to the terminal device, where the second indication information is used to indicate a pilot resource used for channel state information measurement, and the pilot resource is a periodic resource, a semi-persistent resource, or a triggered resource. The network device configures the pilot resource used for channel state information measurement, so that the terminal device can directly perform channel state information measurement on the pilot resource, to reduce a processing latency.

In a possible implementation, the method further includes: The network device receives a request message from the terminal device, where the request message is used to request to obtain the first indication information. In this manner, the network device may be triggered to send the first indication information.

In a possible implementation, an uplink resource used to carry the request message is the uplink resource of the primary cell and/or the uplink resource of the secondary cell. That is, the terminal device may report the request message by using the primary cell or by using the secondary cell.

In a possible implementation, the uplink resource used to carry the request message includes at least one of the following resources: a random access resource, a scheduling request resource, or a channel state information reporting resource of another cell.

In a possible implementation, the another cell is the primary cell or an activated secondary cell. That is, the request message may be reported by using the primary cell or the activated secondary cell.

In a possible implementation, the method further includes: The network device receives third indication information from the terminal device, where the third indication information is used to indicate a time period required for the terminal device to activate the secondary cell. In this manner, the network device may be triggered to send the first indication information.

In a possible implementation, the time period required for activating the secondary cell is determined based on the current state of the secondary cell and/or the secondary cell receiving capability of the terminal device.

In a possible implementation, the current state of the to-be-activated secondary cell of the terminal device is at least one of the following: the cell is unknown, the cell is known, the cell is synchronized in time domain, the cell is not synchronized in time domain, the cell is synchronized in frequency domain, the cell is not synchronized in frequency domain, a receive panel of the cell is known, a receive panel of the cell is unknown, a transmit panel of the cell is known, a transmit panel of the cell is unknown, a receive beam of the cell is known, a receive beam of the cell is unknown, a transmit beam of the cell is known, a transmit beam of the cell is unknown, a CSI measurement result of the cell is known, or a CSI measurement result of the cell is unknown.

In a possible implementation, the secondary cell receiving capability of the terminal device includes at least one of the following information: supporting wide beam receiving, not supporting wide beam receiving, a quantity of panels of the terminal device, a quantity of receive beams of the terminal device, a quantity of beams of a single panel of the terminal device, supporting scanning and receiving of a same synchronization signal block on different symbols by using different beams, or not supporting scanning and receiving of a same synchronization signal block on different symbols by using different beams.

According to a third aspect, a communication apparatus is provided. The communication apparatus includes a processing module and a transceiver module, and is configured to perform the secondary cell activation method according to any one of the first aspect and the implementations of the first aspect. For example, the transceiver module is configured to receive first indication information, where the first indication information is used to indicate an uplink resource for reporting a channel state information measurement result in a secondary cell activation phase. The transceiver module is further configured to send the channel state information measurement result to a network device based on the first indication information.

According to a fourth aspect, a communication apparatus is provided. The communication apparatus includes a processing module and a transceiver module, and is configured to perform the secondary cell activation method according to any one of the second aspect and the implementations of the second aspect. For example, the transceiver module is configured to send first indication information to a terminal device, where the first indication information is used to indicate an uplink resource for reporting a channel state information measurement result in a secondary cell activation phase. The transceiver module is further configured to receive the channel state information measurement result from the terminal device based on the first indication information.

According to a fifth aspect, a communication apparatus is provided. The communication apparatus includes a processor and a memory. The memory is configured to store a program, and the processor invokes the program stored in the memory, to enable the communication apparatus to perform the secondary cell activation method according to any one of the first aspect and the implementations of the first aspect.

According to a sixth aspect, a communication apparatus is provided. The communication apparatus includes a processor and a memory. The memory is configured to store a program, and the processor invokes the program stored in the memory, to enable the communication apparatus to perform the secondary cell activation method according to any one of the second aspect and the implementations of the second aspect.

According to a seventh aspect, a computer-readable storage medium is provided. The computer-readable storage medium stores instructions. When the instructions are run on a computer or a processor, the computer or the processor is enabled to perform the secondary cell activation method according to any one of the first aspect, the second aspect, and the possible implementations of the first aspect and the second aspect.

According to an eighth aspect, a computer program product including instructions is provided. When the instructions are run on a computer or a processor, the computer or the processor is enabled to perform the secondary cell activation method according to any one of the first aspect, the second aspect, and the possible implementations of the first aspect and the second aspect.

According to a ninth aspect, a communication system is provided. The communication system includes the communication apparatus according to the third aspect and the communication apparatus according to the fourth aspect, or includes the communication apparatus according to the fifth aspect and the communication apparatus according to the sixth aspect.

For technical effects of the third aspect to the ninth aspect, refer to the content in the possible implementations of the first aspect and the second aspect.

DESCRIPTION OF EMBODIMENTS

Embodiments of this application may be applied to a time division duplex (TDD) scenario, or are applicable to a frequency division duplex (FDD) scenario.

The embodiments of this application are described based on a 5G communication network scenario in a wireless communication network. It should be noted that, the solutions in the embodiments of this application may alternatively be applied to another wireless communication network such as a 6th generation mobile communication system, and a corresponding name may also be replaced with a name of a corresponding function in the another wireless communication network. A 5G mobile communication system in this application includes a non-standalone (NSA) 5G mobile communication system and/or a standalone (SA) 5G mobile communication system.

The embodiments of this application may be applied to a long term evolution (LTE) system, for example, a narrowband internet of things (NB-IoT) system, or may be applied to a long term evolution advanced (LTE Advanced, LTE-A) system. The embodiments of this application are also applicable to other wireless communication systems such as a global system for mobile communications (GSM) system, a universal mobile telecommunications system (UMTS), a code division multiple access (CDMA) system, and a new network device system.

Figure 1:
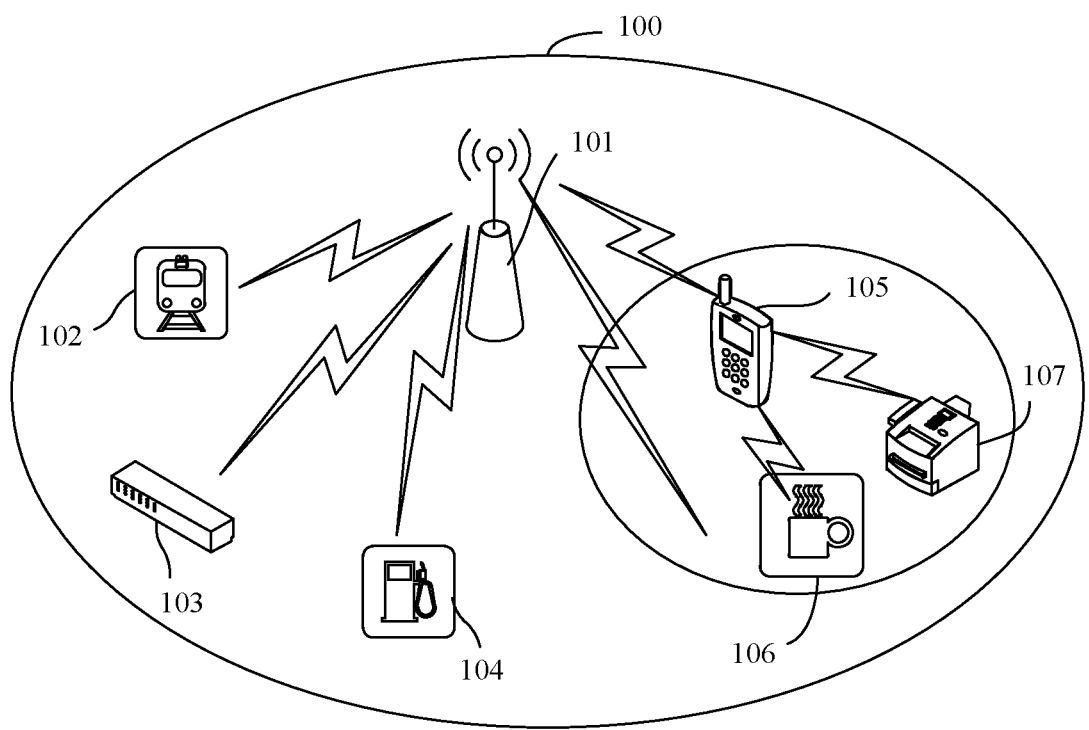
FIG. 1 is a schematic architectural diagram of a communication system according to an embodiment of this application.

As shown in FIG. 1, a communication system 100 provided in an embodiment of this application includes a network device 101 and terminal devices 102 to 107.

The terminal device in this embodiment of this application may be a device that provides a user with voice and/or data connectivity, a handheld device that has a wireless connection function, or another processing device connected to a radio modem. A wireless terminal may communicate with one or more core networks through a radio access network (RAN). The wireless terminal may be a mobile terminal, such as a mobile phone (also referred to as a "cellular" phone) and a computer having a mobile terminal, for example, may be a portable, pocket-sized, handheld, computer built-in, or in-vehicle mobile apparatus that exchanges voice and/or data with the radio access network. For example, the wireless terminal is a device such as user equipment (UE), a personal communications service (PCS) phone, a cordless phone, a session initiation protocol (SIP) phone, a wireless local loop (WLL) station, and a personal digital assistant (PDA). The wireless terminal may also be referred to as a system, a subscriber unit, a subscriber station, a mobile station, a remote station, an access point, a remote terminal, an access terminal, a user terminal, a user agent, a user device, or user equipment. For example, the terminal device may be a high-speed railway communication device 102, a smart air conditioner 103, a smart fuel dispenser 104, a mobile phone 105, a smart teacup 106, a printer 107, or the like. This is not limited in this application.

The network device in the embodiments of this application may be a base station. The base station may be configured to mutually convert a received over-the-air frame and an internet protocol (IP) packet, and serves as a router between the wireless terminal and a rest portion of an access network, where the rest portion of the access network may include an IP network device. The base station may further coordinate attribute management of an air interface. For example, the base station may be a base transceiver station (BTS) in GSM or CDMA, may be a NodeB in wideband code division multiple access (WCDMA), may be an evolved NodeB (evolved NodeB, eNB or eNodeB) in LTE, or may be a gNB in 5G. This is not limited in the embodiments of this application. The foregoing base station is merely an example for description. The network device may alternatively be a relay station, an access point, a vehicle-mounted device, a wearable device, or a device of another type.

Figure 2:
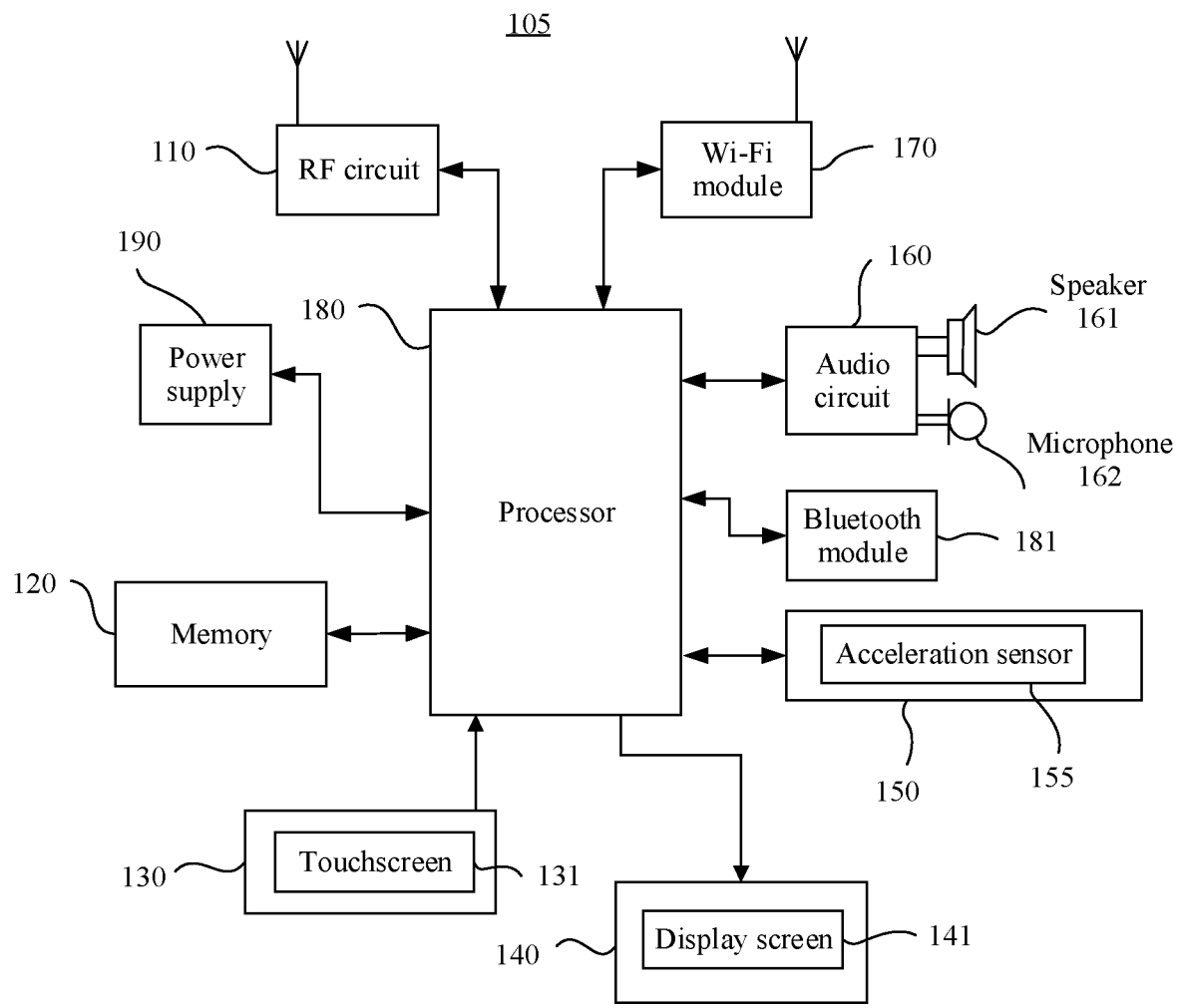
FIG. 2 is a schematic diagram of a structure of a terminal device according to an embodiment of this application.

As shown in FIG. 2, an example in which the terminal device is a mobile phone is used to describe a structure of the terminal device.

The terminal device 105 may include components such as a radio frequency (RF) circuit 110, a memory 120, an input unit 130, a display unit 140, a sensor 150, an audio circuit 160, a wireless fidelity (Wi-Fi) module 170, a processor 180, a Bluetooth module 181, and a power supply 190.

The RF circuit 110 may be configured to receive and send a signal during information receiving and sending or during a call. The RF circuit 110 may receive downlink data from a base station and then deliver the downlink data to the processor 180 for processing, and may send uplink data to the base station. Generally, the RF circuit includes but is not limited to devices such as an antenna, at least one amplifier, a transceiver, a coupler, a low noise amplifier, and a duplexer.

The memory 120 may be configured to store a software program and data. The processor 180 runs the software program or the data stored in the memory 120, to perform various functions of the terminal device 105 and data processing. The memory 120 may include a high-speed random access memory, and may further include a nonvolatile memory, for example, at least one magnetic disk storage device, a flash memory device, or another volatile solid-state storage device. The memory 120 stores an operating system that supports running of the terminal device 105, for example, an iOS® operating system developed by Apple, an Android® open-source operating system developed by Google, and a Windows® operating system developed by Microsoft. The memory 120 in this application may store the operating system and various application programs, and may further store code for performing the method in the embodiments of this application.

The input unit 130 (for example, a touchscreen) may be configured to receive input digit or character information, and generate signal input related to user setting and function control of the terminal device 105. The input unit 130 may include a touchscreen 131 disposed on a front surface of the terminal device 105, and may collect a touch operation of a user on or near the touchscreen 131.

The display unit 140 (namely, a display screen) may be configured to display information input by the user or information provided for the user, and graphical user interfaces (GUI) of various menus of the terminal device 105. The display unit 140 may include a display screen 141 disposed on the front surface of the terminal device 105. The display screen 141 may be configured in a form of a liquid crystal display, a light emitting diode, or the like. The display unit 140 may be configured to display various graphical user interfaces described in this application. The touchscreen 131 may cover the display screen 141, or the touchscreen 131 may be integrated with the display screen 141 to implement input and output functions of the terminal device 105. After integration, the touchscreen 131 and the display screen 141 may be referred to as a touch display screen for short.

The terminal device 105 may further include at least one type of sensor 150, for example, an acceleration sensor 155, an optic sensor, and a movement sensor. The terminal device 105 may be further provided with another sensor, such as a gyroscope, a barometer, a hygrometer, a thermometer, and an infrared sensor.

The audio circuit 160, a speaker 161, and a microphone 162 may provide an audio interface between the user and the terminal device 105. The audio circuit 160 may transmit, to the speaker 161, a received electrical signal obtained after audio data conversion, and the speaker 161 converts the electrical signal into a sound signal for output. In addition, the microphone 162 converts a collected sound signal into an electrical signal. The audio circuit 160 receives the electrical signal, then converts the electrical signal into audio data, and outputs the audio data to the RF circuit 110, to send the audio data to, for example, another terminal, or outputs the audio data to the memory 120 for further processing.

Wi-Fi is a short-distance radio transmission technology. The terminal device 105 may help, through the Wi-Fi module 170, the user to receive and send an email, browse a web page, access streaming media, and the like. The Wi-Fi module 170 provides wireless broadband internet access for the user.

The processor 180 is a control center of the terminal device 105, is connected to each part of the entire terminal through various interfaces and lines, and performs various functions of the terminal device 105 and data processing by running or executing the software program stored in the memory 120 and by invoking the data stored in the memory 120. In this application, the processor 180 may be one or more processors, and the processor 180 may include one or more processing units. The processor 180 may further integrate an application processor and a baseband processor. The application processor mainly processes an operating system, a user interface, an application program, and the like. The baseband processor mainly processes wireless communication. It may be understood that the baseband processor may alternatively not be integrated into the processor 180. The processor 180 in this application may run the operating system, the application programs, user interface display, a touch response, and the communication method in the embodiments of this application.

The Bluetooth module 181 is configured to exchange information, through a Bluetooth protocol, with another Bluetooth device having a Bluetooth module. For example, the terminal device 105 may establish, through the Bluetooth module 181, a Bluetooth connection to a wearable electronic device (for example, a smartwatch) that also has a Bluetooth module, to exchange data.

The terminal device 105 further includes the power supply 190 (such as a battery) that supplies power to various components. The power supply may be logically connected to the processor 180 through a power management system, to implement functions such as charging, discharging, and power consumption management through the power management system.

Figure 3:
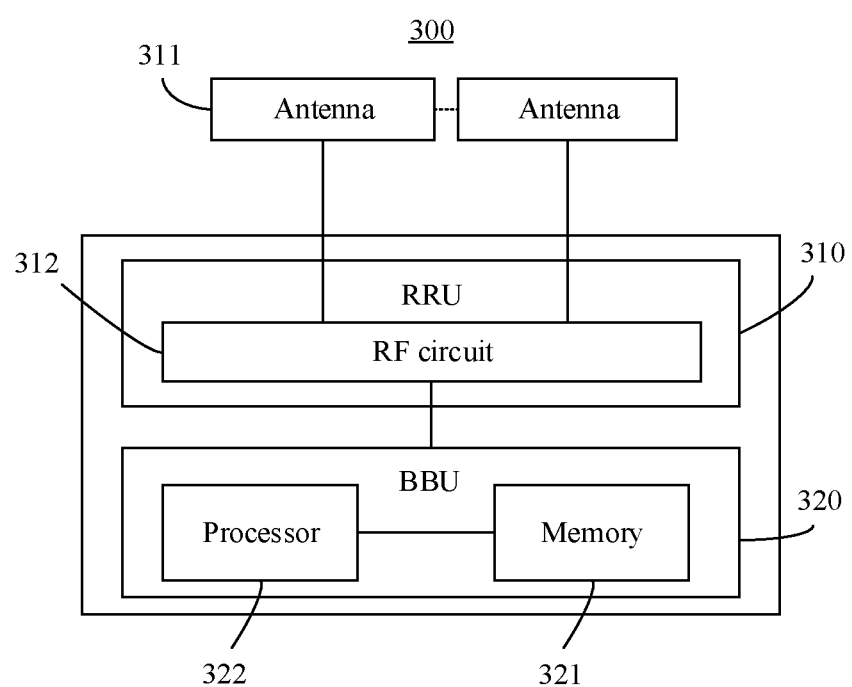
FIG. 3 is a schematic diagram of a structure of a network device according to an embodiment of this application.

As shown in FIG. 3, an embodiment of this application provides a schematic diagram of a structure of a network device. The network device 300 may include one or more radio frequency units, for example, a remote radio unit (RRU) 310 and one or more baseband units (BBU) (which may also be referred to as a digital unit (DU)) 320. The RRU 310 may be referred to as a transceiver unit. Optionally, the RRU 310 may be further referred to as a transceiver machine, a transceiver circuit, a transceiver, a transmitting machine/a receiving machine, or the like, and may include at least one antenna 311 and an RF circuit 312. Optionally, the RRU 310 may include a receiving unit and a sending unit. The receiving unit may correspond to a receiver (or referred to as a receiving machine or a receiving circuit), and the sending unit may correspond to a transmitter (or referred to as a transmitting machine or a transmitting circuit). The RRU 310 is mainly configured to: receive and send a radio frequency signal, and perform conversion between the radio frequency signal and a baseband signal. For example, the RRU 310 is configured to send indication information to a terminal device. The BBU 320 is mainly configured to perform baseband processing, control the network device, and the like. The RRU 310 and the BBU 320 may be physically disposed together, or may be physically disposed separately, namely, a distributed base station.

The BBU 320 is a control center of the network device, may also be referred to as a processing unit, and is mainly configured to complete baseband processing functions such as channel coding, multiplexing, modulation, and spectrum spreading. For example, the BBU 320 may be configured to control the network device to perform the method in this application.

In an example, the BBU 320 may include one or more boards, and a plurality of boards may jointly support a radio access network (for example, an LTE network) having a single access standard, or may separately support radio access networks (for example, an LTE network, a 5G network, or another network) having different access standards. The BBU 320 further includes a memory 321 and a processor 322. The memory 321 is configured to store necessary instructions and data. The processor 322 is configured to control the network device to perform a necessary action, for example, configured to control the network device to perform the method in this application. In this application, the processor 322 may be one or more processors. The memory 321 and the processor 322 may serve the one or more boards. In other words, a memory and a processor may be separately disposed on each board. Alternatively, a plurality of boards may share a same memory and a same processor. In addition, a necessary circuit may be further disposed on each board.

In addition, the network device is not limited to the foregoing forms, and may also be in another form. For example, the network device includes a BBU and an adaptive radio unit (ARU), or includes a BBU and an active antenna unit (AAU), or may be customer-premises equipment (CPE), or may be in another form. This is not limited in this application.

The following describes concepts in this application.

Beam:

The beam is a communication resource. The beam may be a wide beam, a narrow beam, or another type of beam. A beamforming technology may be a beamforming technology or another technical means. By using the beamforming technology, a higher antenna array gain may be obtained by being oriented to a direction in space. The beamforming technology may include a digital beamforming technology, an analog beamforming technology, and a hybrid digital/analog beamforming technology. For example, the analog beamforming technology may be implemented by using a phase shifter, and a phase of a radio frequency chain (RF chain) is adjusted by using the phase shifter, to control a change of an analog beam direction. Therefore, one radio frequency chain can only transmit one analog beam at a same moment. Different beams may be considered as different resources, and same information or different information may be sent by using different beams. Optionally, a plurality of beams having a same communication feature or similar communication features may be considered as one beam. One beam may include one or more antenna ports, used to transmit a data channel, a control channel, a sounding signal, and the like. For example, a transmit beam may refer to distribution of signal strength formed in different directions in space after a signal is transmitted through an antenna, and a receive beam may refer to distribution of signal strength, in different directions in space, of a radio signal received from an antenna. It may be understood that the one or more antenna ports forming the beam may alternatively be considered as one antenna port set. The beam may further be represented as a spatial filter in a protocol. The transmit beam may also be referred to as a spatial transmit filter, and the receive beam may also be referred to as a spatial receive filter.

Beam Management Resource:

The beam management resource is a resource used for beam management, and may also be represented as a resource used to calculate and measure beam quality. The beam quality includes layer 1 reference signal received power (layer 1 reference signal received power, L1-RSRP), layer 1 reference signal received quality (layer 1 reference signal received quality, L1-RSRQ), and the like. For example, the beam management resource may include a synchronization signal, a broadcast channel, a downlink channel measurement reference signal, a tracking signal, a downlink control channel demodulation reference signal, a downlink shared channel demodulation reference signal, an uplink sounding reference signal, and an uplink random access signal.

Beam Indication Information:

The beam indication information is used to indicate a beam (including a transmit beam and/or a receive beam) used for transmission. The beam indication information includes at least one of a beam number, a beam management resource number, a resource number of an uplink signal, a resource number of a downlink signal, an absolute index of a beam, a relative index of a beam, a logical index of a beam, an index of an antenna port corresponding to a beam, an index of an antenna port group corresponding to a beam, an index of a downlink signal corresponding to a beam, a time index of a downlink synchronization signal block corresponding to a beam, beam pair link (BPL) information, a transmit parameter (Tx parameter) corresponding to a beam, a receive parameter (Rx parameter) corresponding to a beam, a transmit weight corresponding to a beam, a weight matrix corresponding to a beam, a weight vector corresponding to a beam, a receive weight corresponding to a beam, an index of a transmit weight corresponding to a beam, an index of a weight matrix corresponding to a beam, an index of a weight vector corresponding to a beam, an index of a receive weight corresponding to a beam, a receive codebook corresponding to a beam, a transmit codebook corresponding to a beam, an index of a receive codebook corresponding to a beam, or an index of a transmit codebook corresponding to a beam. The downlink signal includes any one of a synchronization signal, a broadcast channel, a broadcast signal demodulation signal, a CSI-RS, a cell specific reference signal (CS-RS), a user equipment specific reference signal (US-RS), a downlink control channel demodulation reference signal, a downlink data channel demodulation reference signal, or a downlink phase noise tracking signal. The uplink signal includes any one of an uplink random access sequence, an uplink sounding reference signal, an uplink control channel demodulation reference signal, an uplink data channel demodulation reference signal, or an uplink phase noise tracking signal. Optionally, the network device may further allocate a QCL identifier to beams having a quasi-colocation (QCL) relationship in beams associated with a frequency resource group. The beam indication information may be further represented as a transmission configuration index (TCI). The TCI may include a plurality of parameters such as a cell number, a bandwidth part number, a reference signal identifier, a synchronization signal block identifier, and a QCL type.

Beam Quality:

A measurement indicator for measuring the beam quality is not limited in this application, and possible indicators include reference signal received power (RSRP), reference signal received quality (RSRQ), a block error rate (BLER), a received signal strength indicator (RSSI), a signal to interference and noise ratio (SINR), a channel quality indicator (CQI), a correlation, and the like.

QCL:

The QCL relationship is used to indicate that a plurality of resources have one or more same or similar communication features. For the plurality of resources that have the QCL relationship, same or similar communication configurations may be used. For example, if two antenna ports have the QCL relationship, a large-scale channel property in which one port transmits a symbol may be inferred from a large-scale channel property in which the other port transmits a symbol. The large-scale property may include a delay spread, an average delay, a Doppler spread, a Doppler frequency shift, an average gain, a receive parameter, a receive beam number of a terminal device, a transmit/receive channel correlation, a receive angle of arrival, a spatial correlation of a receiver antenna, a dominant angle of arrival (AoA), an average angle of arrival, an AoA spread, and the like.

Spatial Quasi-Colocation (Spatial QCL):

The spatial quasi-colocation may be considered as a type of QCL. The term "spatial" may be understood from a perspective of a transmit end or a receive end. From the perspective of the transmit end, if two antenna ports are spatially quasi-colocated, it indicates that beam directions corresponding to the two antenna ports are the same in space. From the perspective of the receive end, if two antenna ports are spatially quasi-colocated, it indicates that the receive end can receive, in a same beam direction, signals sent through the two antenna ports.

Qcl Assumption:

The QCL assumption means that it is assumed that whether there is a QCL relationship between two ports. A configuration and an indication of the quasi-colocation assumption may be used to help the receive end receive and demodulate a signal. For example, the receive end can determine that a port A and a port B have the QCL relationship. In other words, a large-scale parameter of a signal measured on the port A may be used for signal measurement and demodulation on the port B.

Simultaneous Receiving:

The simultaneous receiving mentioned in this application includes: A receive end (for example, a terminal device) receives a plurality of signals on one receiving parameter. The simultaneous receiving also includes: receiving a plurality of signals on a plurality of receive parameters that can be used simultaneously.

Antenna Panel:

Signals in wireless communication need to be received and sent through antennas, and a plurality of antenna elements may be integrated onto one antenna panel. One radio frequency chain may drive one or more antenna elements. In this application, a terminal device may include a plurality of antenna panels, and each antenna panel includes one or more beams. When the terminal device includes the plurality of antenna panels, each antenna panel may face one direction, and omnidirectional sending and receiving can be implemented. A network device may also include the plurality of antenna panels, and each antenna panel includes one or more beams. The antenna panel may also be represented as an antenna array or an antenna subarray. One antenna panel may include one or more antenna arrays/subarrays. One antenna panel may be controlled by one or more oscillators. The radio frequency chain may also be referred to as a receive channel and/or a transmit channel, a receiver branch, or the like. One antenna panel may be driven by one radio frequency chain, or may be driven by a plurality of radio frequency chains. Therefore, the antenna panel in this application may alternatively be replaced with a radio frequency chain, a plurality of radio frequency chains that drive one antenna panel, or one or more radio frequency chains that are controlled by one oscillator.

Carrier Aggregation (CA):

To satisfy requirements on an increased single-user peak rate and a higher system capacity, a direct method is increasing a system transmission bandwidth. A technology for increasing a transmission bandwidth, that is, carrier aggregation, is introduced into LTE-A. In CA, a plurality of LTE component carriers (CC) may be aggregated, and each CC corresponds to one cell, thereby increasing the system transmission bandwidth, and effectively improving uplink and downlink transmission rates. A terminal device determines, based on a capability of the terminal device, a maximum quantity of carriers that can be simultaneously used for uplink and downlink transmission.

Cells in carrier aggregation include a primary cell and a secondary cell. The primary cell is a cell operating on a primary frequency. In this cell, the terminal device performs an initial connection establishment process or initiates a re-establishment process. The cell also serves as a primary cell in a handover process. The secondary cell is a cell operating on a secondary frequency. In this cell, a radio resource control (RRC) connection is established by using a primary cell configuration, to provide additional radio resources.

For a terminal device that is in a connected mode and for which no CA is configured, only one primary cell serves as a serving cell. For a terminal device that is in a connected mode and for which CA is configured, a serving cell is used to indicate one or more cells including a primary cell and a secondary cell.

Figure 4:
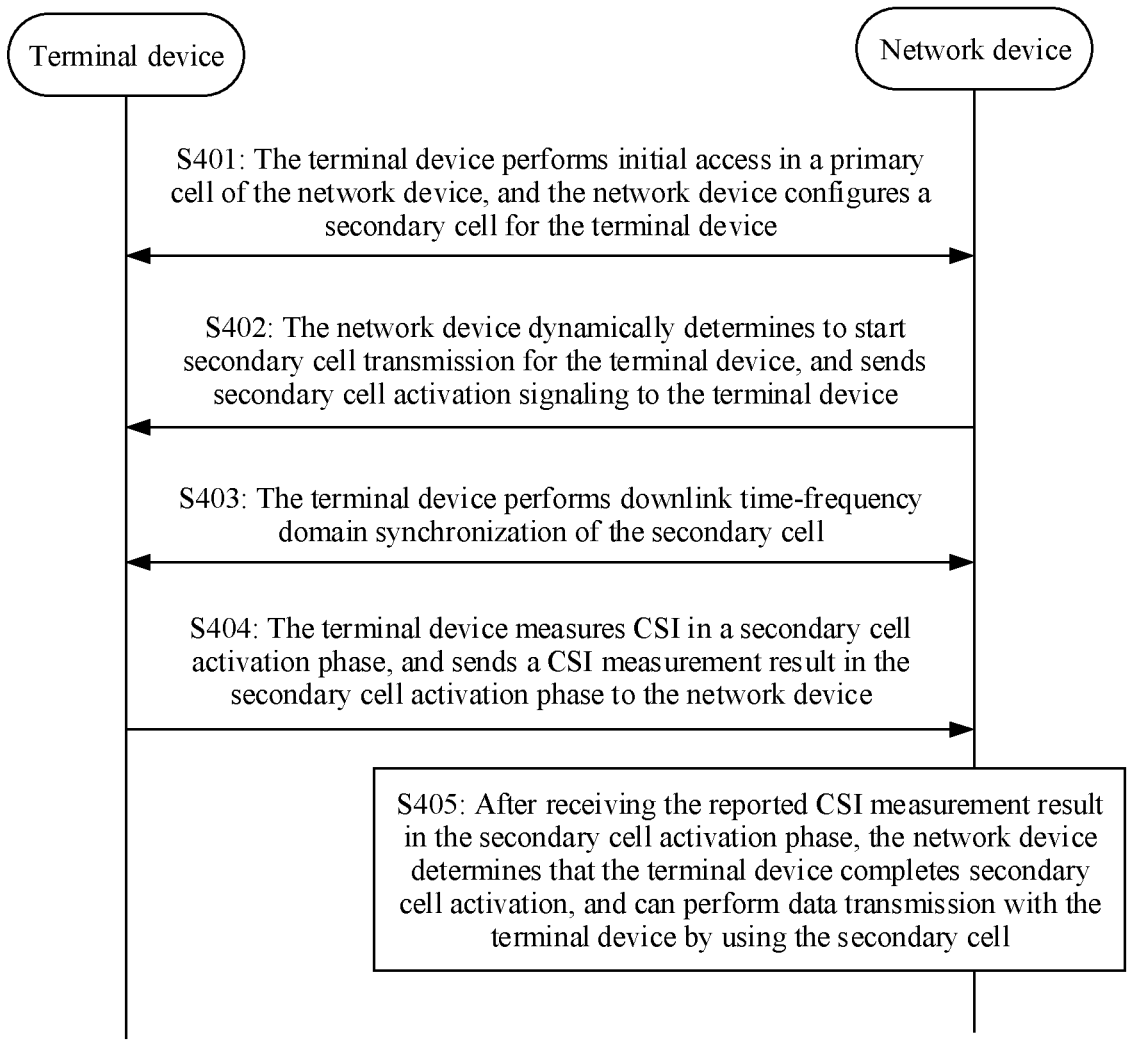
FIG. 4 is a schematic flowchart 1 of a secondary cell activation method according to an embodiment of this application.

First, a secondary cell activation method in a current technology is described, and the method is used by a terminal device and a network device to activate a secondary cell. As shown in FIG. 4, the method includes the following steps.

S401: The terminal device performs initial access in a primary cell of the network device, and the network device configures the secondary cell for the terminal device.

The primary cell of the network device configures the secondary cell for the terminal device. Further, the primary cell of the network device may configure the secondary cell for the terminal device by using RRC signaling.

The RRC signaling includes a configuration parameter of a cell group to which the secondary cell and the primary cell belong, and a configuration parameter of the secondary cell.

According to the 3GPP Release 15, the configuration parameter of the cell group to which the secondary cell and the primary cell belong includes an identifier (cellGroupId) of the cell group, an RLC bearer addition list (rlc-BearerToAddModList), an RLC bearer release list (rlc-BearerToReleaseList), a MAC layer configuration (mac-CellGroupConfig) of the cell group, a physical layer configuration (physicalCellGroupConfig) of the cell group, a primary cell configuration (spCellConfig) of a secondary cell group, a secondary cell addition list (sCellToAddModList) of the cell group, and a secondary cell release list (sCellToReleaseList) of the cell group.

According to the 3GPP Release 15, the configuration parameter of the secondary cell includes a secondary cell index (sCellIndex), a cell-level parameter configuration (sCellConfigCommon) of the secondary cell, a UE-level parameter configuration (sCellConfigDedicated) of the secondary cell, and a synchronization signal block (SSB) measurement timing configuration (SSB-MTC) of the secondary cell.

The SSB-MTC includes an SSB measurement periodicity and a time offset (periodicityAndOffset) of the secondary cell, and an SSB measurement window (duration) of the secondary cell.

Optionally, the configuration parameter of the secondary cell may further include a periodic pilot measurement and reporting resource, an initial or default bandwidth part (BWP) configuration of a CC, a mobility measurement configuration of the CC, and the like.

S402: The network device dynamically determines to start secondary cell transmission for the terminal device, and sends secondary cell activation signaling to the terminal device.

Correspondingly, the terminal device receives the secondary cell activation signaling from the network device.

The network device may send the secondary cell activation signaling to the terminal device by using media access control control element (MAC-CE) signaling.

Figure 5A:
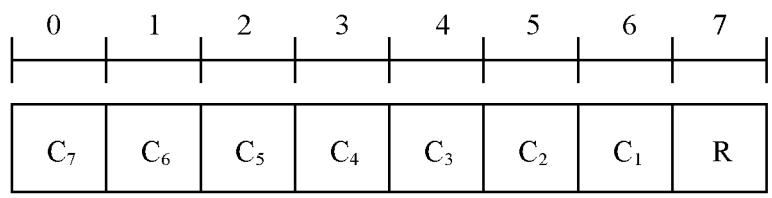
FIG. 5A is a schematic diagram of secondary cell activation signaling according to an embodiment of this application.
Figures 5B, 6:
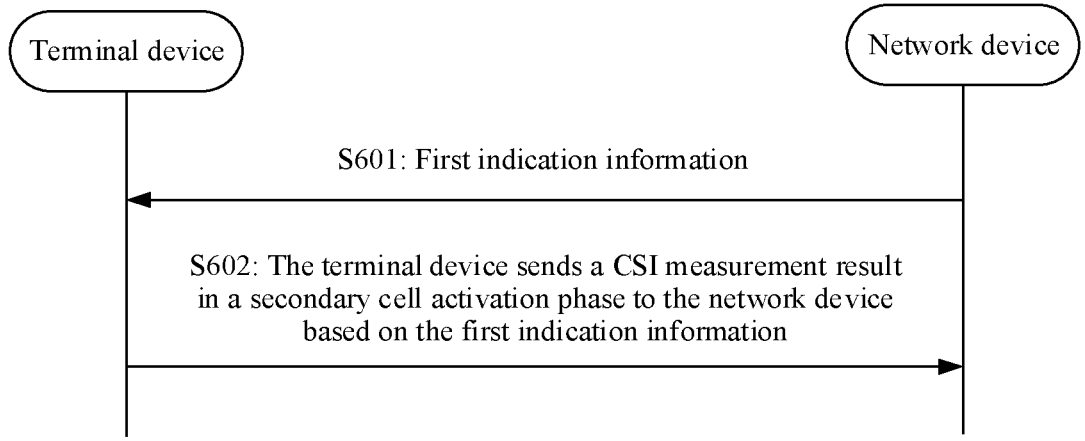
FIG. 5B is another schematic diagram of secondary cell activation signaling according to an embodiment of this application.
FIG. 6 is a schematic flowchart 2 of a secondary cell activation method according to an embodiment of this application.

The secondary cell activation signaling specified in the 3GPP Release 15 is shown in FIG. 5A or FIG. 5B. FIG. 5A shows a one-byte MAC-CE, and FIG. 5B shows a four-byte MAC-CE. Ci indicates a secondary cell whose secondary cell index (sCellIndex) is i and that is to be activated or deactivated. When Ci is set to 0, it indicates that the secondary cell whose secondary cell index (sCellIndex) is i is to be deactivated. When Ci is set to 1, it indicates that the secondary cell whose secondary cell index (sCellIndex) is i is to be activated. R is a reserved bit.

S403: The terminal device performs downlink time-frequency domain synchronization of the secondary cell.

The terminal device determines, based on the SSB-MTC in the RRC signaling, a time-frequency domain position for sending an SSB, and detects an SSB signal of the secondary cell in a corresponding time window, to implement the downlink time-frequency domain synchronization of the secondary cell. Further, on the premise that the terminal device completes the downlink time-frequency domain synchronization by using the SSB, the terminal device receives other pilot signals (for example, a tracking reference signal (TRS), a phase tracking reference signal (PTRS), or a non-zero power channel state information reference signal resource (NZP-CSI-RS)), to complete higher-precision downlink time-frequency domain synchronization.

If a currently activated secondary cell is an FR2-CC, there is no activated serving cell in an FR2, and the terminal device has no transmit-receive beam reference information of the FR2, in a secondary cell activation phase, the terminal device needs to perform transmit-receive beam scanning, select a proper transmit-receive beam pair for the activation phase, and implement the downlink time-frequency domain synchronization of the secondary cell based on the transmit-receive beam pair.

S404: The terminal device measures CSI in the secondary cell activation phase, and sends a CSI measurement result in the secondary cell activation phase to the network device.

Correspondingly, the network device receives the CSI measurement result in the secondary cell activation phase from the terminal device.

The CSI in the secondary cell activation phase is measured based on a pilot resource configured by using the RRC signaling. The CSI measurement result in the secondary cell activation phase is reported based on a reporting resource configured by using the RRC signaling.

S405: After receiving the reported CSI measurement result in the secondary cell activation phase, the network device determines that the terminal device completes secondary cell activation, and can perform data transmission with the terminal device by using the secondary cell.

In addition, if the network device does not receive, at a moment T after delivering the secondary cell activation signaling, the reported CSI measurement result in the secondary cell activation phase, the network device determines that the secondary cell activation fails.

The secondary cell activation method may have the following disadvantages.

Disadvantage 1:

In a scenario in which only downlink transmission (DL-only) is performed in a high frequency band, when there is no uplink channel in the high frequency band, the CSI measurement result in the secondary cell activation phase cannot be reported. The terminal device can measure the CSI in the secondary cell activation phase based only on a secondary cell periodic pilot resource configured when the secondary cell is added.

This is because a maximum quantity of pilot resources (for example, NZP-CSI-RS resources) that can be configured for each CC is a terminal device capability reporting parameter, and a valid value ranges from 1 to 32. However, a maximum quantity of SSB resources that can be configured for each CC is 64. When the network device configures the configuration parameter of the secondary cell for the terminal device by using the RRC signaling, the network device needs to select, based on the maximum quantity of pilot resources that can be configured for each CC and that is reported by the terminal device, some CSI-RS resources from cell-level CSI-RS resources, to be configured for the terminal device. When a beam used for sending the CSI-RS resource does not include a serving beam of the terminal device, the terminal device cannot measure the CSI in the secondary cell activation phase, and consequently, the secondary cell activation fails.

Disadvantage 2:

In a scenario in which a high frequency band and a low frequency band cooperate, the high frequency band may be used only for traffic offloading of data transmission. When no data transmission is performed in the high frequency band, a high-frequency secondary cell may be deactivated. To reduce power consumption of the terminal device, a relatively long high-frequency inactive state measurement periodicity may be configured. When data transmission needs to be performed in the high frequency band, the high-frequency secondary cell is activated. In this case, if the terminal device is equipped with a plurality of high-frequency antenna panels, and different antenna panels may cover a plurality of different directions, when the secondary cell is activated, the terminal device needs to perform receive beam scanning until a relatively good receive beam is found to successfully detect the SSB, and complete downlink synchronization. The CSI in the secondary cell activation phase is measured based on the pilot resource and the reporting resource that are configured by using the RRC signaling and that are used for CSI measurement, and the measurement result is reported. This process requires a long processing latency. As a result, user service experience in a service congestion scenario is severely affected.

According to a secondary cell activation method provided in an embodiment of this application, a network device indicates a terminal device to report an uplink resource of a channel state information measurement result in a secondary cell activation phase, so that the terminal device can report the channel state information measurement result in the secondary cell activation phase to the network device. Further, the network device configures a pilot resource used for channel state information measurement, so that the terminal device can directly perform CSI measurement on the pilot resource, to reduce a processing latency.

As shown in FIG. 6, the method includes the following steps.

S601: The network device sends first indication information to the terminal device.

Correspondingly, the terminal device receives the first indication information from the network device. The first indication information is used to indicate the uplink resource for reporting the CSI measurement result in the secondary cell activation phase.

For example, the first indication information may be carried in RRC signaling.

Optionally, the uplink resource indicated by the first indication information is an uplink resource of a primary cell and/or an uplink resource of a secondary cell. That is, the terminal device may report the CSI measurement result in the secondary cell activation phase by using the uplink resource of the primary cell, or may report the CSI measurement result in the secondary cell activation phase by using the uplink resource of the secondary cell; or may report the CSI measurement result in the secondary cell activation phase by using both the uplink resource of the primary cell and the uplink resource of the secondary cell.

Optionally, the uplink resource indicated by the first indication information includes at least one of the following resources: a random access channel resource, an uplink data channel transmission resource, or an uplink control channel transmission resource. Further, the random access channel resource, the uplink data channel transmission resource, and the uplink control channel transmission resource may be uplink resources of the primary cell; and/or the random access channel resource, the uplink data channel transmission resource, and the uplink control channel transmission resource may be uplink resources of the secondary cell.

Optionally, the uplink resource may be a periodic resource, a semi-persistent resource, or a triggered resource.

If the uplink resource is a periodic resource, the uplink resource is valid only in the secondary cell activation phase, or is valid before the uplink resource is reconfigured by using RRC signaling.

If the uplink resource is a semi-persistent resource, when receiving secondary cell activation signaling, the terminal device may consider by default that the semi-persistent resource is activated; or the terminal device may activate the semi-persistent resource based on third indication information, where the third indication information and the secondary cell activation signaling may be sent by the network device to the terminal device, or the third indication information is sent by the network device to the terminal device by using MAC-CE or layer 1 signaling after the secondary cell activation signaling is sent to the terminal device. When sending the CSI measurement result in the secondary cell activation phase, the terminal device may consider by default that the semi-persistent resource is deactivated; or the terminal device may deactivate the semi-persistent resource based on fourth indication information, where the fourth indication information may be sent by the network device to the terminal device by using the MAC-CE or layer 1 signaling after the terminal device reports the CSI measurement result in the secondary cell activation phase.

If the uplink resource is a triggered resource, when receiving the secondary cell activation signaling, the terminal device may consider by default that the triggered resource is activated; or the terminal device may activate the triggered resource based on fifth indication information, where the fifth indication information may be sent by the network device to the terminal device by using the MAC-CE or layer 1 signaling. Optionally, the fifth indication information may be determined by the network device based on sixth indication information, where the sixth indication information is used to indicate a time period required for the terminal device to activate the secondary cell.

S602: The terminal device sends the CSI measurement result in the secondary cell activation phase to the network device based on the first indication information.

Correspondingly, the network device receives the CSI measurement result in the secondary cell activation phase from the terminal device.

The CSI measurement result includes at least one of the following information: a synchronization signal block identifier (SSB-ID), a CSI-RS resource identifier (CRI), a rank indicator (RI), reference signal received power (RSRP), reference signal received quality (RSRQ), a precoding matrix indicator (PMI), a channel quality indicator (CQI), a signal to interference plus noise ratio (SINR), a signal-to-noise ratio (SNR), a current state of the secondary cell, or a secondary cell receiving capability of the terminal device.

Optionally, the current state of the secondary cell is at least one of the following: the cell is unknown, the cell is known, the cell is synchronized in time domain, the cell is not synchronized in time domain, the cell is synchronized in frequency domain, the cell is not synchronized in frequency domain, a receive panel of the cell is known, a receive panel of the cell is unknown, a transmit panel of the cell is known, a transmit panel of the cell is unknown, a receive beam of the cell is known, a receive beam of the cell is unknown, a transmit beam of the cell is known, a transmit beam of the cell is unknown, a CSI measurement result of the cell is known, or a CSI measurement result of the cell is unknown.

Optionally, the secondary cell receiving capability of the terminal device includes at least one of the following information: supporting wide beam receiving, not supporting wide beam receiving, a quantity of panels of the terminal device, a quantity of beams of the terminal device, a quantity of beams of a single panel of the terminal device, supporting scanning and receiving of a same synchronization signal block on different symbols by using different beams, or not supporting scanning and receiving of a same synchronization signal block on different symbols by using different beams.

Optionally, the CSI measurement result in the secondary cell activation phase may further include an SSB resource identifier corresponding to an SSB signal for implementing downlink synchronization and a received signal measurement value (for example, RSRP, RSRQ, an SINR, a CQI, or an SNR) of the SSB signal for implementing downlink synchronization.

Optionally, the terminal device may measure an SSB, a periodic downlink pilot signal, an activated semi-persistent downlink pilot signal, or an activated triggered downlink pilot signal that is of the to-be-activated secondary cell and that is indicated by the RRC signaling, to select a transmit-receive beam pair (for example, select a transmit-receive beam pair having maximum RSRP). The CSI measurement result in the secondary cell activation phase may further include a received signal CSI measurement value (for example, RSRP) corresponding to the beam pair.

According to the secondary cell activation method provided in this embodiment of this application, the terminal device receives the first indication information, where the first indication information is used to indicate the uplink resource for reporting the channel state information measurement result in the secondary cell activation phase. The terminal device sends the channel state information measurement result to the network device based on the first indication information. The network device indicates the terminal device to report the uplink resource of the channel state information measurement result in the secondary cell activation phase, so that the terminal device can report the channel state information measurement result in the secondary cell activation phase to the network device.

Figure 7:
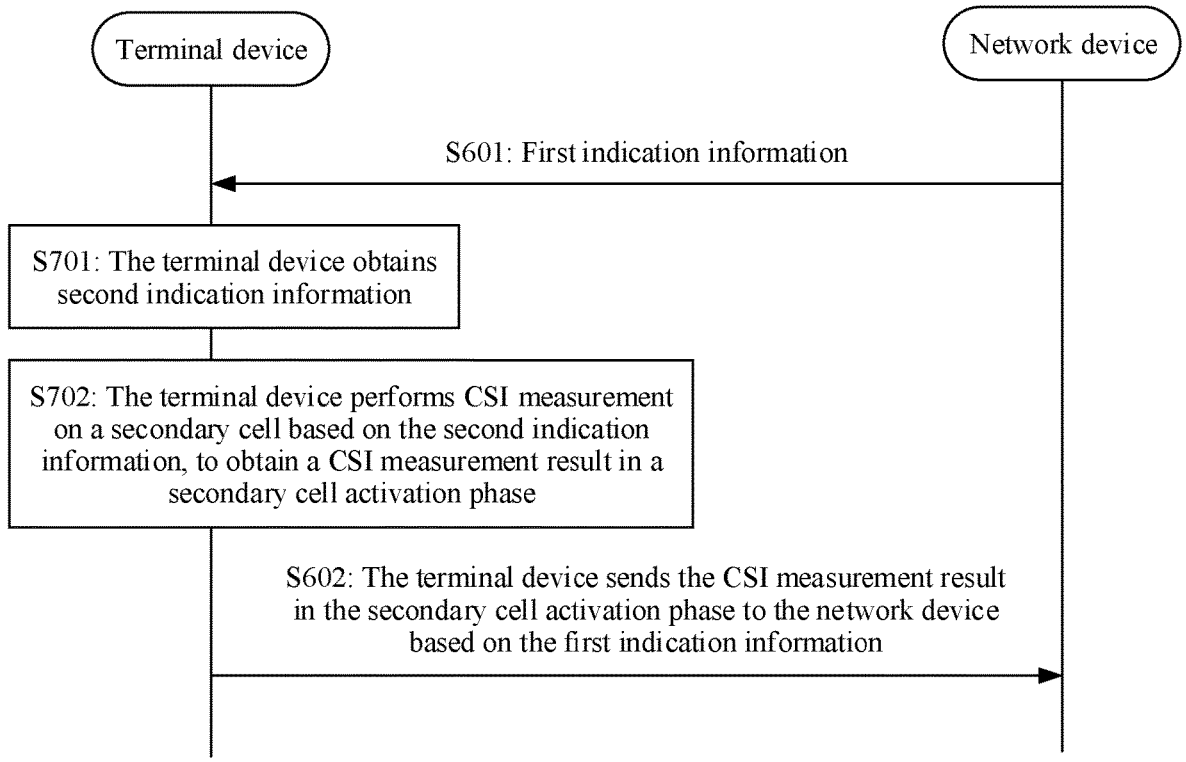
FIG. 7 is a schematic flowchart 3 of a secondary cell activation method according to an embodiment of this application.

Optionally, as shown in FIG. 7, based on the method shown in FIG. 6, the method may further include the following steps.

S701: The terminal device obtains second indication information.

The second indication information is used to indicate a pilot resource used for CSI measurement, and the pilot resource may be a periodic resource, a semi-persistent resource, or a triggered resource. For the periodic resource, the semi-persistent resource, or the triggered resource, refer to the foregoing descriptions. Details are not described herein again.

The pilot resource may be at least one of the following resources: an SSB, a tracking reference signal (TRS), a phase tracking reference signal (PTRS), a demodulation reference signal (DMRS), a non-zero power channel state information reference signal resource (NZP-CSI-RS), a zero power channel state information reference signal resource (ZP-CSI-RS), or channel state information interference measurement (CSI-IM).

Optionally, in an implementation, the network device may send the second indication information to the terminal device. Correspondingly, the terminal device may receive the second indication information from the network device. The second indication information and the first indication information may be carried in same RRC signaling or carried in different RRC signaling. This is not limited in this application.

Optionally, in another implementation, the terminal device may freely determine a receive beam for CSI measurement. For example, the terminal device randomly selects a receive beam. Alternatively, the terminal device selects, with reference to a direction of arrival of a received signal of another serving cell, a receive beam whose direction is the same as or similar to a beam direction of a currently activated secondary cell.

For example, the second indication information may include at least one of the following information: a periodicity and a time offset (PeriodicityAndOffset) of the pilot resource, an identifier (ServCellIndex) of a serving cell carrying the pilot resource, an identifier (BandwidthPartId) of a BWP carrying the pilot resource, time-frequency domain position information of the pilot resource, or the like.

S702: The terminal device performs CSI measurement on the secondary cell based on the second indication information, to obtain the CSI measurement result in the secondary cell activation phase.

As described above, the terminal device may determine, based on the SSB-MTC in the RRC signaling, the time-frequency domain position for sending the SSB, and detects the SSB signal of the secondary cell in the corresponding time window, to implement the downlink time-frequency domain synchronization of the secondary cell. Further, on the premise that the terminal device completes the downlink time-frequency domain synchronization by using the SSB, the terminal device receives other pilot signals (for example, a TRS, a PTRS, or an NZP-CSI-RS), to complete higher-precision downlink time-frequency domain synchronization. Then, the terminal device determines, based on the second indication information, a time-frequency domain position of the pilot resource for performing CSI measurement in the secondary cell activation phase, receives the pilot resource by using a receive beam that satisfies a preset condition, and obtains the CSI measurement result in the secondary cell activation phase. Satisfying the preset condition includes at least one of the following: being same as a receive beam for completing downlink time-frequency domain synchronization, being same as beam coverage of the receive beam for completing downlink time-frequency domain synchronization, or being similar to beam coverage of the receive beam for completing downlink time-frequency domain synchronization. The beam coverage refers to 3 dB coverage of a beam or a main lobe direction of the beam.

Further, the network device may send seventh indication information to the terminal device. Correspondingly, the terminal device receives the seventh indication information from the network device, where the seventh indication information is used to indicate CSI measurement results to be reported. The terminal device may measure the CSI in the secondary cell activation phase based on the second indication information and the seventh indication information, to obtain the CSI measurement result in the secondary cell activation phase. That is, the terminal device may determine, based on the second indication information, pilot resources to be measured, and determine, based on the seventh indication information, measurement results to be obtained by measuring the pilot resources.

It should be noted that the seventh indication information and the first indication information may be carried in same RRC signaling or carried in different RRC signaling. This is not limited in this application.

Figure 8:
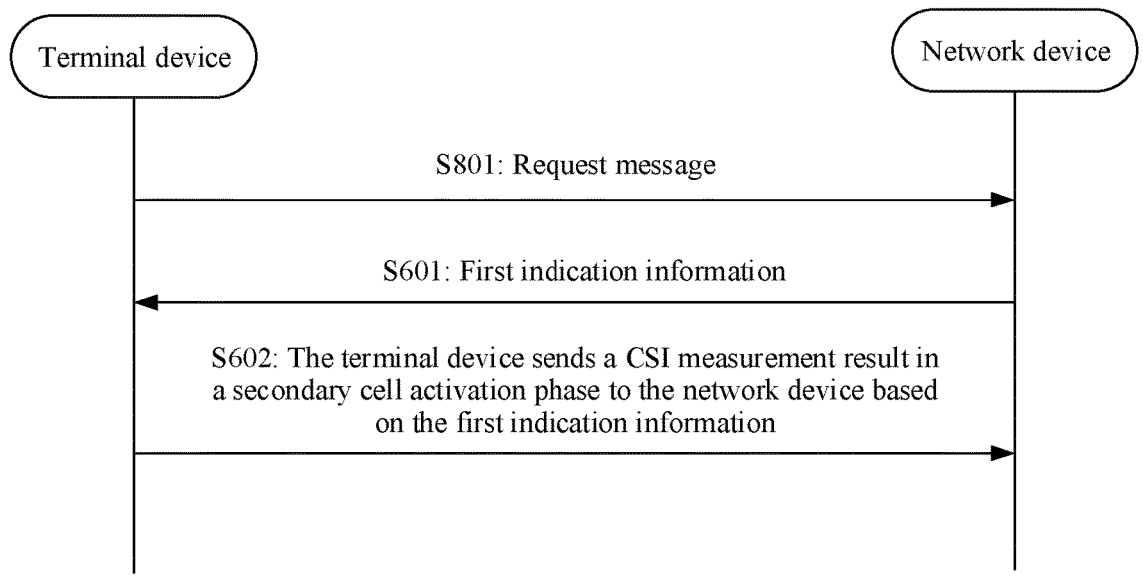
FIG. 8 is a schematic flowchart 4 of a secondary cell activation method according to an embodiment of this application.

Optionally, as shown in FIG. 8, based on the method shown in FIG. 6, the method may further include the following steps.

S801: The terminal device sends a request message to the network device.

Correspondingly, the network device receives the request message from the terminal device. The request message is used to request to obtain the first indication information.

Optionally, an uplink resource used to carry the request message may be the uplink resource of the primary cell and/or the uplink resource of the secondary cell.

Optionally, the uplink resource used to carry the request message may include at least one of the following resources: a random access resource, a scheduling request (SR) resource, or a CSI reporting resource of another cell. The another cell is the primary cell or an activated secondary cell.

The random access resource used to carry the request message may be configured by the network device for the terminal device by using the RRC signaling, and the RRC signaling includes at least one of the following information: an identifier (ServCellIndex) of a serving cell carrying a random access channel (RACH), an identifier (uplinkBandwidthPartId) of a BWP carrying the RACH, a RACH time-frequency resource position (ra-Occasion), a random access sequence (ra-PreambleIndex), or the like. Optionally, the random access resource is valid only in a specific time period. For example, the random access resource is valid in a time period between a time point at which the network device delivers the secondary cell activation signaling and a time point at which the network device receives the CSI measurement result in the secondary cell activation phase for the first time; or is valid in a time period between a time point at which the network device delivers the secondary cell activation signaling and a maximum secondary cell activation latency defined in a protocol.

The scheduling request resource used to carry the request message may be configured by the network device for the terminal device by using the RRC signaling, and the RRC signaling includes at least one of the following information: a periodicity and a time offset of the resource, a time-frequency domain position of the resource, or the like.

For the CSI reporting resource of the another cell, the request message may be sent to the network device by setting CSI reporting information as a special field (for example, a value of the RI is set to be greater than a maximum quantity of transport streams that can be supported by the terminal device), to indicate that the terminal device requires the uplink resource to send the CSI measurement result in the secondary cell activation phase.

Figure 9:
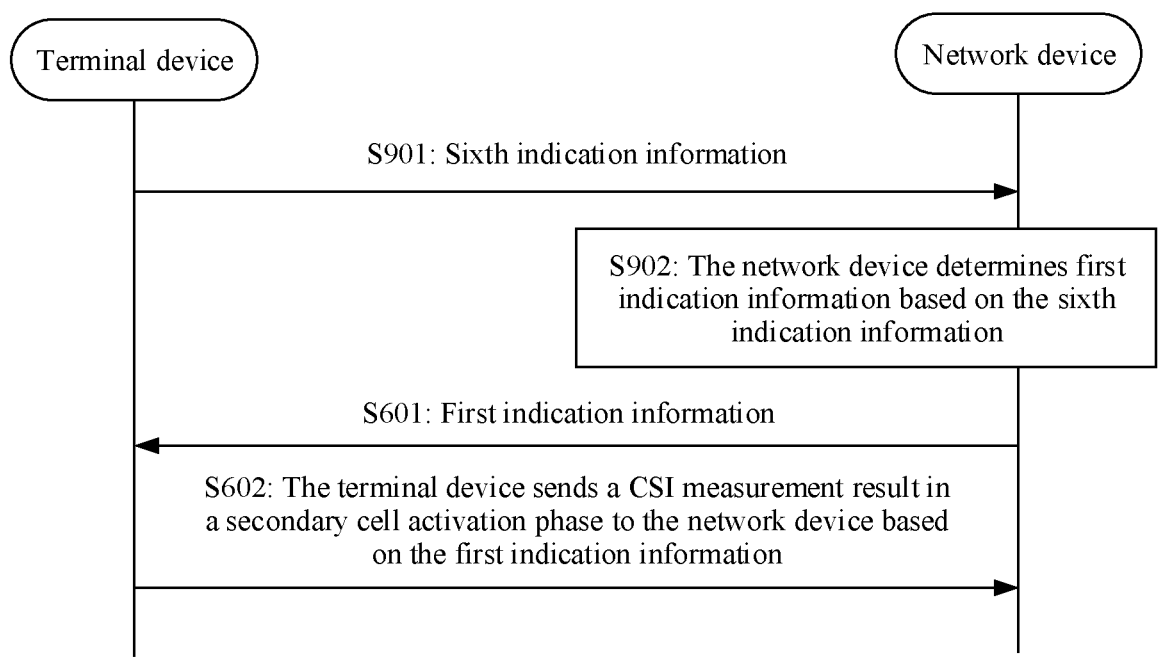
FIG. 9 is a schematic flowchart 5 of a secondary cell activation method according to an embodiment of this application.

Optionally, as shown in FIG. 9, based on the method shown in FIG. 6, the method may further include the following steps.

S901: The terminal device sends sixth indication information to the network device.

Correspondingly, the network device receives the sixth indication information from the terminal device.

The sixth indication information is used to indicate a time period required for the terminal device to activate the secondary cell. The sixth indication information may be used to indicate the network device to allocate a proper uplink resource for reporting the CSI measurement result in the secondary cell activation phase, or may be used to indicate the network device to determine a maximum secondary cell activation latency of the terminal device.

The time period required for activating the secondary cell is determined based on the current state of the secondary cell and/or the receiving capability of the terminal device.

The sixth indication information may indicate in an implicit manner, that is, indirectly indicate the time period required for the terminal device to activate the secondary cell.

For example, if the terminal device reports that wide beam receiving of the to-be-activated secondary cell is supported and the to-be-activated secondary cell is unknown, the network device may determine, based on a processing latency in cell discovery, automatic gain control (AGC), a radio frequency (RF) setting, and downlink synchronization, the time period required for activating the secondary cell. If the terminal device reports that only narrow beam receiving of the to-be-activated secondary cell is supported and the to-be-activated secondary cell is unknown, the network device may determine, based on a processing latency in cell discovery, AGC, an RF setting, downlink synchronization, and receive beam scanning, the time period required for activating the secondary cell. If the terminal device reports that only narrow beam receiving of the to-be-activated secondary cell is supported, the to-be-activated secondary cell is known, and a beam is known, the network device may determine, based on a processing latency in AGC and an RF setting, the time period required for activating the secondary cell. The downlink synchronization includes downlink time domain synchronization and/or downlink frequency domain synchronization.

The sixth indication information may indicate in an explicit manner, that is, directly indicate the time period required for the terminal device to activate the secondary cell.

For example, in an implementation, a unit is an SSB-MTC periodicity, and a quantity of quantized bits is X1. Assuming that X1=3 and an SSB-MTC sending periodicity is 20 subframes (assuming that each subframe is 1 ms), "011" indicates that the time period required for the terminal device to activate the secondary cell is 3×20 ms=60 ms.

In another implementation, a unit is a millisecond, and a quantity of quantized bits is X2. Assuming that X2=3, "011" indicates that the time period required for the terminal device to activate the secondary cell is 3 ms.

In still another implementation, a unit is a subframe, and a quantity of quantized bits is X3. Assuming that X3=3 and a subframe length is 0.5 ms, 001 indicates that the time period required for the terminal device to activate the secondary cell is 0.5×3=1.5 ms.

The sixth indication information may alternatively indicate in an implicit manner. The sixth indication information includes the current state of the to-be-activated secondary cell of the terminal device and/or a beam receiving capability of the terminal device. The network device determines based on the sixth indication information, the time period required for the terminal device to activate the secondary cell.

For example, a quantity of quantized bits of the sixth indication information is Y. Assuming that Y=3, "000" indicates that the current state of the to-be-activated secondary cell of the terminal device is that the cell is unknown and the beam is unknown.

The sixth indication information may be carried in the following manner. In an implementation, the sixth indication information may be carried in a dynamically scheduling uplink resource of the primary cell. In another implementation, the sixth indication information and hybrid automatic repeat request (HARQ)-acknowledgment (ACK) information of the secondary cell activation signaling may be carried in a same message and reported to the network device together. For example, assuming that a quantity of bits of reporting information of the terminal device is Y, the first Y1 bits are used to carry the HARQ-ACK information of the secondary cell activation signaling, and the last Y2 bits are used to carry the sixth indication information (Y1+Y2<Y).

S902: The network device determines the first indication information based on the sixth indication information.

For example, if the time period that is required for the terminal device to activate the secondary cell and that is indicated by the sixth indication information is 3 ms, the network device determines that a time domain position of the reporting resource used for reporting the CSI measurement result in the secondary cell activation phase is greater than or equal to T0+(3+Z) ms. T0 is a moment at which the network device delivers the secondary cell activation signaling, and Z includes a MAC processing latency, a HARQ-ACK feedback latency of the secondary cell activation signaling, an uplink sending processing delay of the terminal device, and the like.

Figure 10:
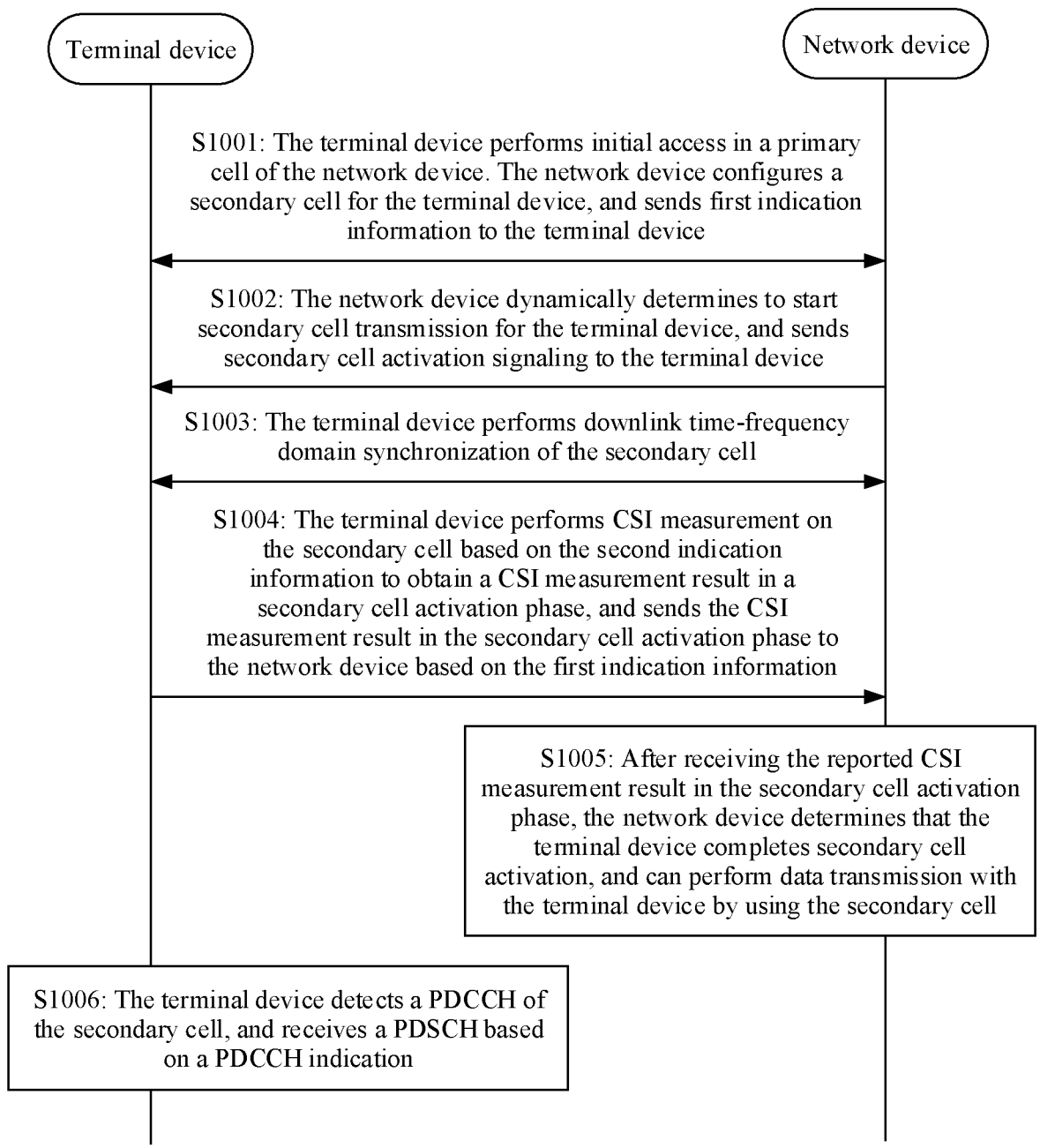
FIG. 10 is a schematic flowchart 6 of a secondary cell activation method according to an embodiment of this application.

As shown in FIG. 10, an embodiment of this application provides another secondary cell activation method. The method includes S1001 to S1006.

S1001: A terminal device performs initial access in a primary cell of a network device. The network device configures a secondary cell for the terminal device, and sends first indication information to the terminal device.

Optionally, the network device may further send at least one of second indication information or seventh indication information to the terminal device. Correspondingly, the terminal device receives at least one of the second indication information or the seventh indication information from the network device.

The primary cell of the network device may configure the secondary cell for the terminal device by using RRC signaling. In addition to the content described in step S401, the RRC signaling may further include a reporting configuration parameter (CSIreportingConfigforSCellactivation) of a CSI measurement result in a secondary cell activation phase, and the reporting configuration parameter includes the first indication information. Optionally, the configuration parameter may further include at least one of the second indication information or the seventh indication information. For example, the configuration parameter CSIreportingConfigforSCellactivation is shown in Table 1 along with a listing of possible configuration information.

TABLE 1

| Configuration parameter (CSIreportingConfigforSCellactivation) | | |
|---|---|---|
| Configuration information | | Meanings of information |
| CSI reporting configuration identifier (CSIreportingConfigID) | | Identifying a reporting configuration parameter (CSIreportingConfigforSCellactivation) |
| Seventh indication information (reportQuantity) | | Indicating CSI measurement results to be reported by the terminal device |
| Second indication information (CSIreportingResource) | PeriodicityAndOffset | Periodicity and time offset of a reporting resource |
| | ServCellIndex | Identifier of a serving cell carrying reporting content |
| | uplinkBandwidthPartId | Identifier of a BWP carrying the reporting content |
| | PUCCH-ResourceId | Identifier of a PUCCH resource carrying the reporting content |
| First indication information | csi-ResourceConfigId | Indicating an uplink resource |

TABLE 1-continued

Configuration parameter (CSIreportingConfigforSCellactivation)

| Configuration information | Meanings of information |
|---|---|
| (Resourceformeasurement) | for reporting the CSI measurement result in the secondary cell activation phase |

The CSI reporting configuration identifier (CSIreportingConfigID) is used to identify the reporting configuration parameter (CSIreportingConfigforSCellactivation parameter).

The seventh indication information (reportQuantity) is used to indicate the CSI measurement results to be reported by the terminal device. For descriptions of the CSI measurement result, refer to the descriptions of step S702. Details are not described herein again.

The second indication information (CSIreportingResource) is used to indicate a pilot resource used for CSI measurement. It should be noted that this implementation provides only one manner in which the terminal device obtains the second indication information, and the terminal device may alternatively obtain the second indication information in another manner. For descriptions of the second indication information, refer to the descriptions of step S701. Details are not described herein again.

The first indication information (Resourceformeasurement) is used to indicate the uplink resource for reporting the CSI measurement result in the secondary cell activation phase. For descriptions of the first indication information, refer to the descriptions of the foregoing step S601. Details are not described herein again.

S1002: The network device dynamically determines to start secondary cell transmission for the terminal device, and sends secondary cell activation signaling to the terminal device.

For content of step S1002, refer to step S402. Details are not described herein again.

S1003: The terminal device performs downlink time-frequency domain synchronization of the secondary cell.

This step is the same as S403, and details are not described herein again.

S1004: The terminal device performs CSI measurement on the secondary cell based on the second indication information to obtain the CSI measurement result in the secondary cell activation phase, and sends the CSI measurement result in the secondary cell activation phase to the network device based on the first indication information.

If the network device sends the second indication information and the seventh indication information to the terminal device in step S1001, the terminal device may measure the CSI in the secondary cell activation phase based on the second indication information and the seventh indication information, to obtain the CSI measurement result in the secondary cell activation phase. That is, the terminal device may determine, based on the second indication information, pilot resources on which CSI measurement is to be performed, and determine, based on the seventh indication information, measurement results to be obtained by performing CSI measurement on the pilot resource.

If the network device sends the seventh indication information to the terminal device but does not send the second indication information in step S1001, the terminal device may freely determine the second indication information from any receive beam. For example, the terminal device randomly selects a receive beam. Alternatively, the terminal device selects, with reference to a direction of arrival of a received signal of another serving cell, a receive beam whose direction is the same as or similar to a beam direction of a currently activated secondary cell.

If the network device sends the second indication information but does not send the seventh indication information to the terminal device in step S1001, the terminal device may determine, based on the second indication information, pilot resources to be measured, and report some or all of the CSI measurement results in the secondary cell activation phase according to a protocol specification.

If the network device does not send the second indication information and the seventh indication information to the terminal device in step S1001, the terminal device may directly use an SSB resource identifier corresponding to an SSB signal for implementing downlink synchronization and a received signal CSI measurement value (for example, RSRP) of the SSB signal for implementing downlink synchronization as the CSI measurement result in the secondary cell activation phase.

For other content, refer to the descriptions of the foregoing steps S602 and S702. Details are not described herein again.

S1005: After receiving the reported CSI measurement result in the secondary cell activation phase, the network device determines that the terminal device completes secondary cell activation, and can perform data transmission with the terminal device by using the secondary cell.

In addition, if the network device does not receive, at a moment T after delivering the secondary cell activation signaling, the reported CSI measurement result in the secondary cell activation phase, the network device determines that the secondary cell activation fails.

S1006: The terminal device detects a physical downlink control channel (PDCCH) of the secondary cell, and receives a physical downlink shared channel (PDSCH) based on a PDCCH indication.

It should be noted that in a time period between a time point at which the terminal device reports the CSI measurement result in the secondary cell activation phase and a time point at which the terminal device receives high-frequency channel activation TCI signaling, a default TCI is used to receive a downlink channel. One manner is to receive the downlink channel by using a receive beam for downlink synchronization in the secondary cell activation phase. Another manner is to decide with reference to a PDSCH receive beam of the primary cell.

Figure 11:
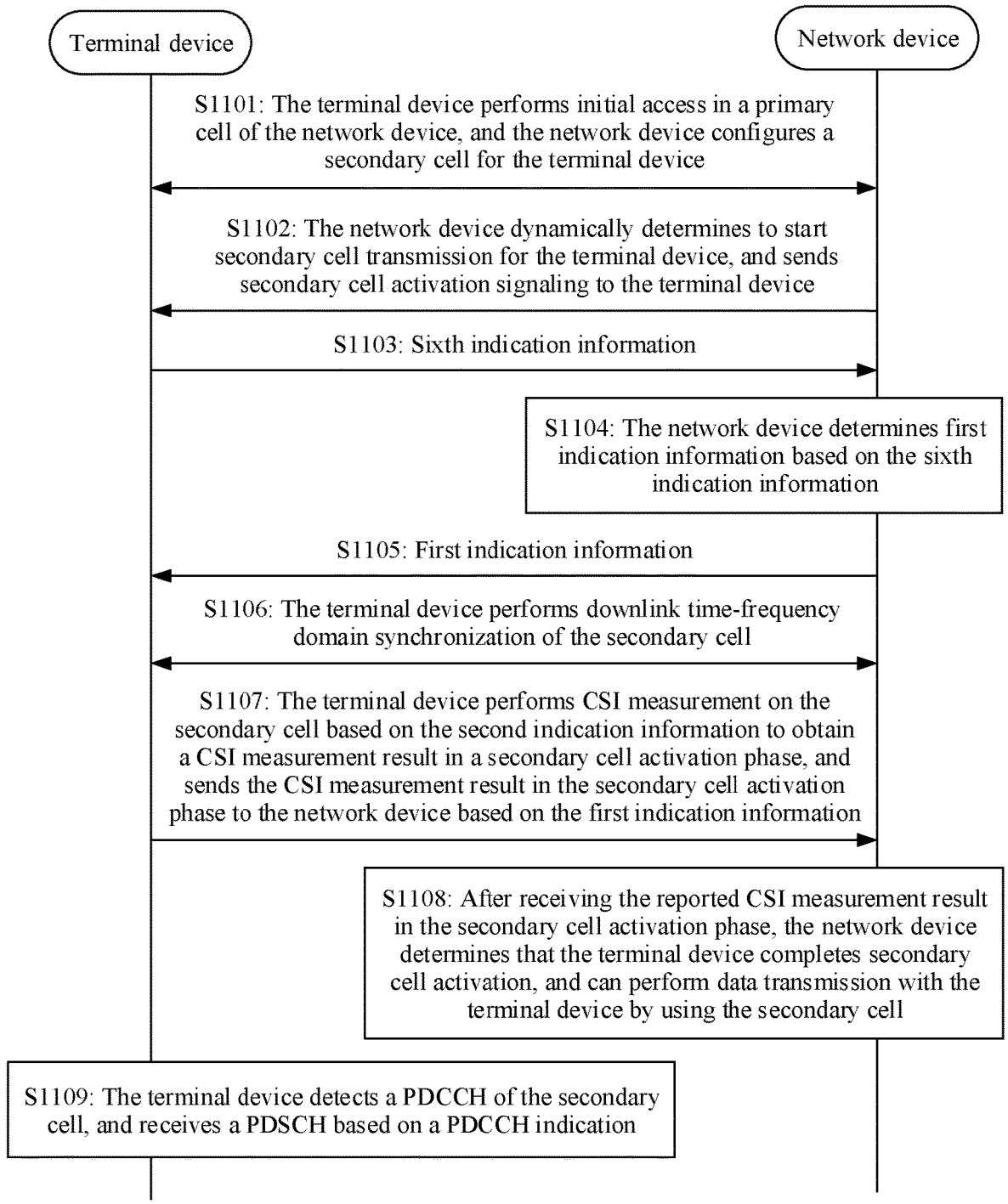
FIG. 11 is a schematic flowchart 7 of a secondary cell activation method according to an embodiment of this application.

As shown in FIG. 11, an embodiment of this application provides still another secondary cell activation method. A terminal device sends sixth indication information to a network device, to indicate a time period required for the terminal device to activate a secondary cell, and trigger the network device to configure first indication information based on the time period. The method includes S1101 to S1109.

Steps S1101 and S1102 are the same as steps S401 and S402, and details are not described herein again.

Steps S1103 and S1104 are the same as steps S901 and S902, and details are not described herein again.

S1105: The network device sends the first indication information to the terminal device.

For this step, refer to related content in S1001. Details are not described herein again.

Steps S1106 to S1109 are the same as steps S1003 to S1006, and details are not described herein.

Figure 12:
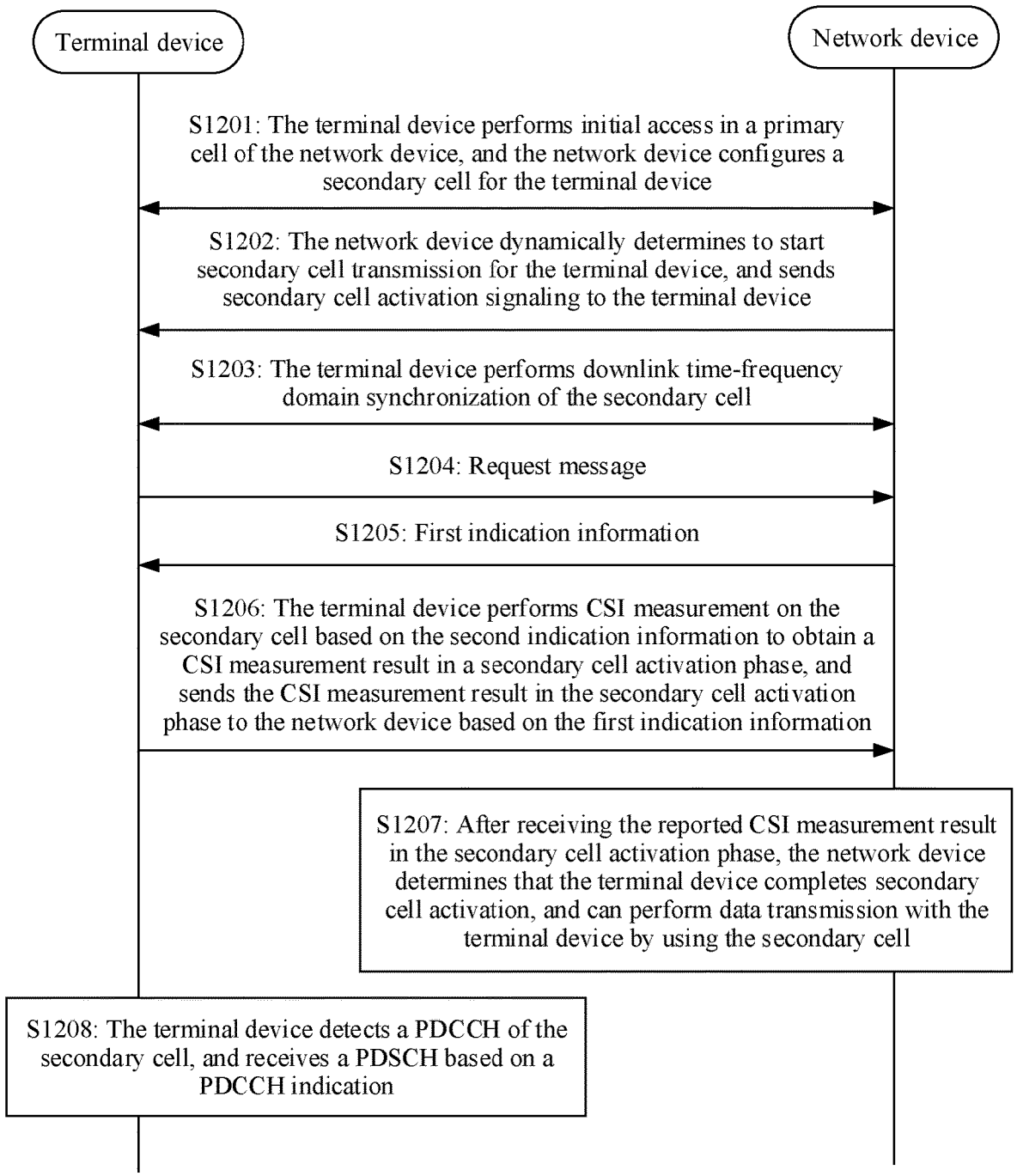
FIG. 12 is a schematic flowchart 8 of a secondary cell activation method according to an embodiment of this application.

As shown in FIG. 12, an embodiment of this application provides still another secondary cell activation method. A terminal device sends a request message to a network device, to trigger the network device to configure first indication information. The method includes S1201 to S1208.

Steps S1201 to S1203 are the same as steps S401 to S403, and details are not described herein.

S1204: The terminal device sends the request message to the network device.

This step is the same as step S801, and details are not described herein again.

S1205: The network device sends the first indication information to the terminal device.

For this step, refer to step S1001. Details are not described herein again.

Steps S1206 to S1208 are the same as steps S1004 to S1006, and details are not described herein.

Figure 13:
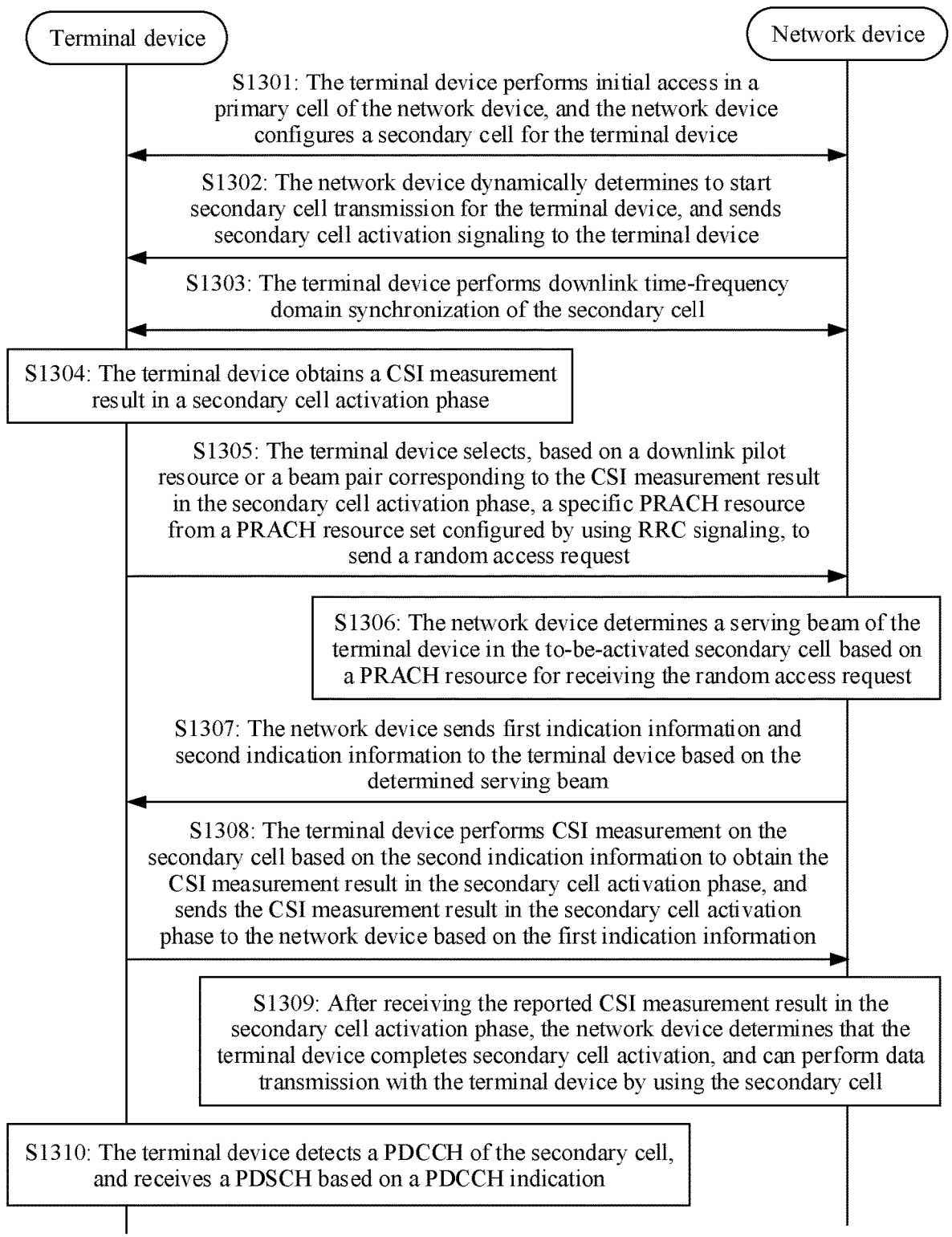
FIG. 13 is a schematic flowchart 9 of a secondary cell activation method according to an embodiment of this application.

As shown in FIG. 13, an embodiment of this application provides still another secondary cell activation method. The method includes the following steps.

Steps S1301 to S1303 are the same as steps S401 to S403, and details are not described herein.

S1304: The terminal device obtains a CSI measurement result in a secondary cell activation phase.

The terminal device may directly use an SSB resource identifier corresponding to an SSB signal for implementing downlink synchronization and a received signal CSI measurement value (for example, RSRP, RSRQ, an SINR, an SNR, or a CQI) of the SSB signal for implementing downlink synchronization as the CSI measurement result in the secondary cell activation phase.

Alternatively, the terminal device may measure an SSB, a periodic downlink pilot signal, an activated semi-persistent downlink pilot signal, or an activated triggered downlink pilot signal that is of the to-be-activated secondary cell and that is indicated by RRC signaling, to select a transmit-receive beam pair (for example, select a transmit-receive beam pair having maximum RSRP). The CSI measurement result in the secondary cell activation phase may further include a received signal CSI measurement value (for example, RSRP, RSRQ, an SINR, an SNR, or a CQI) corresponding to the beam pair.

S1305: The terminal device selects, based on or a downlink pilot resource or a beam pair corresponding to the CSI measurement result in the secondary cell activation phase, a PRACH resource from a PRACH resource set configured by using the RRC signaling, to send a random access request.

Correspondingly, the network device receives the random access request from the terminal device by using the PRACH resource.

For example, as shown in Table 2, assuming that the downlink pilot resource corresponding to the CSI measurement result in the secondary cell activation phase is an SSB #1, a PRACH resource corresponding to a PRACH #1 is selected to send the random access request.

TABLE 2

| PRACH resource identifier | Downlink pilot resource identifier | Transmit beam identifier |
|---|---|---|
| PRACH #1 | SSB #1 | TX beam #1 |
| PRACH #2 | SSB #2, SSB #3 | TX beam #2, TX beam #3 |
| PRACH #3 | CSI-RS resource #1 | TX beam #4 |
| PRACH #4 | CSI-RS resource #2, CSI-RS resource #3 | TX beam #5 |

S1306: The network device determines a serving beam of the terminal device in the to-be-activated secondary cell based on the PRACH resource for receiving the random access request.

For example, as shown in Table 2, assuming that the network device receives the random access request by using the PRACH resource corresponding to the PRACH #1, the network device may determine that the serving beam of the terminal device in the to-be-activated secondary cell is a transmit beam corresponding to the TX beam #1.

S1307: The network device sends first indication information and second indication information to the terminal device based on the determined serving beam.

For example, assuming that the network device determines that the serving beam of the terminal device is the beam corresponding to the TX beam #1, a pilot resource corresponding to the TX beam #1 is configured as the second indication information, to indicate a pilot resource used by the terminal device to measure CSI in the secondary cell activation phase. In consideration of a pilot resource position T1, a CSI measurement processing latency T2 of the terminal device, and an uplink sending processing latency T3 of the terminal device that are indicated by the second indication information, an uplink resource whose time domain position is greater than or equal to T1+T2+T3 is configured as the first indication information, to indicate an uplink resource used by the terminal device to report the CSI measurement result in the secondary cell activation phase.

For example, assuming that the network device determines that the serving beam of the terminal device is the TX beam #1, an uplink resource that has same spatial filtering as the TX beam #1 and that is for receiving is configured as the first indication information, to indicate an uplink resource used by the terminal device to report the CSI measurement result in the secondary cell activation phase.

Steps S1308 to S1310 are the same as steps S1004 to S1006, and details are not described herein.

It should be noted that steps S1307 to S1309 are optional. After S1306 is performed, the network device may also determine that the terminal device completes secondary cell activation.

It should be noted that, in various embodiments of this application, "CSI measurement" may alternatively be replaced with "valid CSI measurement", or may be replaced with "beam management".

It may be understood that, in the foregoing embodiments, methods and/or steps implemented by the terminal device may alternatively be implemented by a component (for example, a chip or a circuit) that can be used in the terminal device, and methods and/or steps implemented by the network device may alternatively be implemented by a component that can be used in the network device.

The foregoing mainly describes the solutions provided in the embodiments of this application from a perspective of interaction between the network elements. Correspondingly, an embodiment of this application further provides a communication apparatus. The communication apparatus is configured to implement the foregoing methods. The communication apparatus may be the terminal device in the foregoing method embodiments, or an apparatus including the foregoing terminal device, or a component that can be used in the terminal device. Alternatively, the communication apparatus may be the network device in the foregoing method embodiments, or an apparatus including the foregoing network device, or a component that can be used in the network device. It may be understood that, to implement the foregoing functions, the communication apparatus includes a corresponding hardware structure and/or software module for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In the embodiments of this application, the communication apparatus may be divided into function modules based on the foregoing method embodiments. For example, each function module may be obtained through division based on each corresponding function, or two or more functions may be integrated into one processing module. The integrated module may be implemented in a form of hardware, or may be implemented in a form of a software function module. It should be noted that module division in the embodiments of this application is an example, and is merely a logical function division. During actual implementation, another division manner may be used.

The foregoing describes in detail the methods provided in the embodiments of this application with reference to FIG. 6 to FIG. 13. The following describes in detail communication devices provided in the embodiments of this application with reference to FIG. 7 to FIG. 9. It should be understood that descriptions of the apparatus embodiments correspond to the descriptions of the method embodiments. Therefore, for content that is not described in detail, refer to the foregoing method embodiments. For brevity, details are not described herein again.

Figure 14:
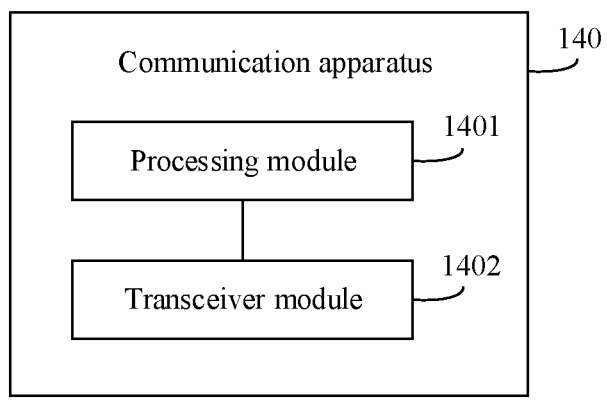
FIG. 14 is a schematic diagram of a structure of a terminal device according to an embodiment of this application.

An embodiment of this application provides a communication apparatus. The communication apparatus may be the terminal device, or a chip or a function module of the terminal device. For example, the communication apparatus is the terminal device in the foregoing method embodiments. The communication apparatus may implement corresponding steps or procedures performed by the terminal device in the foregoing method embodiments. FIG. 14 is a schematic diagram of a structure of a communication apparatus 140. The communication apparatus 140 includes a processing module 1401 and a transceiver module 1402. The transceiver module 1402 may also be referred to as a transceiver unit, is configured to implement a sending and/or receiving function, and for example, may be a transceiver circuit, a transceiver machine, a transceiver, or a communication interface.

The transceiver module 1402 is configured to receive first indication information, where the first indication information is used to indicate an uplink resource for reporting a channel state information measurement result in a secondary cell activation phase.

The transceiver module 1402 is further configured to send the channel state information measurement result to a network device based on the first indication information.

Optionally, the channel state information measurement result includes at least one of the following information: a synchronization signal block identifier SSB-ID, a CSI-RS resource identifier CRI, a rank indicator RI, reference signal received power RSRP, reference signal received quality RSRQ, a precoding matrix indicator PMI, a channel quality indicator CQI, a signal to interference plus noise ratio SINR, a signal-to-noise ratio SNR, a current state of a secondary cell, or a secondary cell receiving capability of the terminal device.

Optionally, the uplink resource indicated by the first indication information is an uplink resource of a primary cell and/or an uplink resource of the secondary cell.

Optionally, the uplink resource indicated by the first indication information includes at least one of the following resources: a random access channel resource, an uplink data channel transmission resource, or an uplink control channel transmission resource.

Optionally, the uplink resource is a periodic resource, a semi-persistent resource, or a triggered resource.

Optionally, the processing module 1401 is configured to obtain second indication information, where the second indication information is used to indicate a pilot resource used for channel state information measurement, and the pilot resource is a periodic resource, a semi-persistent resource, or a triggered resource.

Optionally, the transceiver module 1402 is further configured to send a request message to the network device, where the request message is used to request to obtain the first indication information.

Optionally, an uplink resource used to carry the request message is the uplink resource of the primary cell and/or the uplink resource of the secondary cell.

Optionally, the uplink resource used to carry the request message includes at least one of the following resources: a random access resource, a scheduling request resource, or a channel state information reporting resource of another cell.

Optionally, the another cell is the primary cell or an activated secondary cell.

Optionally, the transceiver module 1402 is further configured to send third indication information to the network device, where the third indication information is used to indicate a time period required for the terminal device to activate the secondary cell.

Optionally, the time period required for activating the secondary cell is determined based on the current state of the secondary cell and/or the secondary cell receiving capability of the terminal device.

Optionally, the current state of the to-be-activated secondary cell of the terminal device is at least one of the following: the cell is unknown, the cell is known, the cell is synchronized in time domain, the cell is not synchronized in time domain, the cell is synchronized in frequency domain, the cell is not synchronized in frequency domain, a receive panel of the cell is known, a receive panel of the cell is unknown, a transmit panel of the cell is known, a transmit panel of the cell is unknown, a receive beam of the cell is known, a receive beam of the cell is unknown, a transmit beam of the cell is known, a transmit beam of the cell is unknown, a CSI measurement result of the cell is known, or a CSI measurement result of the cell is unknown.

Optionally, the secondary cell receiving capability of the terminal device includes at least one of the following information: supporting wide beam receiving, not supporting wide beam receiving, a quantity of panels of the terminal device, a quantity of receive beams of the terminal device, a quantity of beams of a single panel of the terminal device, supporting scanning and receiving of a same synchronization signal block on different symbols by using different beams, or not supporting scanning and receiving of a same synchronization signal block on different symbols by using different beams.

All related content of the steps in the foregoing method embodiments may be cited in function descriptions of corresponding function modules or descriptions on the foregoing method side. Details are not described herein again.

In this embodiment, the communication apparatus 140 is presented in a form of function modules obtained through division in an integrated manner. The "module" herein may be a specific ASIC, a circuit, a processor that executes one or more software or firmware programs and a memory, an integrated logic circuit, and/or another component that can provide the foregoing functions. In a simple embodiment, a person skilled in the art may figure out that the communication apparatus 140 may be in a form of the terminal device 105 shown in FIG. 2.

For example, the processor 180 in the terminal device 105 shown in FIG. 2 may invoke the computer-executable instructions stored in the memory 120, to enable the terminal device 105 to perform the secondary cell activation method in the foregoing method embodiments.

The processor 180 in the terminal device 105 shown in FIG. 2 may invoke the computer-executable instructions stored in the memory 120, to implement functions/implementation processes of the processing module 1401 and the transceiver module 1402 in FIG. 14. Alternatively, the processor 180 in the terminal device 105 shown in FIG. 2 may invoke the computer-executable instructions stored in the memory 120, to implement functions/implementation processes of the processing module 1401 in FIG. 14, and the RF circuit 110 in the terminal device 105 shown in FIG. 2 may implement functions/implementation processes of the transceiver module 1402 in FIG. 14.

The communication apparatus provided in this embodiment may be configured to perform the foregoing secondary cell activation method. Therefore, for technical effects that can be achieved by the communication apparatus, refer to the foregoing method embodiments. Details are not described herein.

Figure 15:
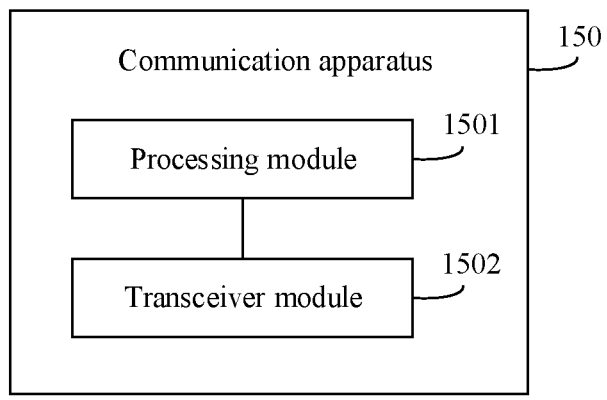
FIG. 15 is a schematic diagram of a structure of a network device according to an embodiment of this application.

An embodiment of this application provides a communication apparatus. The communication apparatus may be the network device, or a chip or a function module of the network device. For example, the communication apparatus is the network device in the foregoing method embodiments. The communication apparatus may implement corresponding steps or procedures performed by the network device in the foregoing method embodiments. FIG. 15 is a schematic diagram of a structure of a communication apparatus 150. The communication apparatus 150 includes a processing module 1501 and a transceiver module 1502. The transceiver module 1502 may also be referred to as a transceiver unit, is configured to implement a sending and/or receiving function, and for example, may be a transceiver circuit, a transceiver machine, a transceiver, or a communication interface.

The transceiver module 1502 is configured to send first indication information to a terminal device, where the first indication information is used to indicate an uplink resource for reporting a channel state information measurement result in a secondary cell activation phase.

The transceiver module 1502 is further configured to receive the channel state information measurement result from the terminal device based on the first indication information.

Optionally, the channel state information measurement result includes at least one of the following information: a synchronization signal block identifier SSB-ID, a CSI-RS resource identifier CRI, a rank indicator RI, reference signal received power RSRP, reference signal received quality RSRQ, a precoding matrix indicator PMI, a channel quality indicator CQI, a signal to interference plus noise ratio SINR, a signal-to-noise ratio SNR, a current state of a secondary cell, or a secondary cell receiving capability of the terminal device.

Optionally, the uplink resource indicated by the first indication information is an uplink resource of a primary cell and/or an uplink resource of the secondary cell.

Optionally, the uplink resource indicated by the first indication information includes at least one of the following resources: a random access channel resource, an uplink data channel transmission resource, or an uplink control channel transmission resource.

Optionally, the uplink resource is a periodic resource, a semi-persistent resource, or a triggered resource.

Optionally, the transceiver module 1502 is configured to send second indication information to the terminal device, where the second indication information is used to indicate a pilot resource used for channel state information measurement, and the pilot resource is a periodic resource, a semi-persistent resource, or a triggered resource.

Optionally, the transceiver module 1502 is further configured to receive a request message from the terminal device, where the request message is used to request to obtain the first indication information.

Optionally, an uplink resource used to carry the request message is the uplink resource of the primary cell and/or the uplink resource of the secondary cell.

Optionally, the uplink resource used to carry the request message includes at least one of the following resources: a random access resource, a scheduling request resource, or a channel state information reporting resource of another cell.

Optionally, the another cell is the primary cell or an activated secondary cell.

Optionally, the transceiver module 1502 is further configured to receive third indication information from the terminal device, where the third indication information is used to indicate a time period required for the terminal device to activate the secondary cell.

Optionally, the time period required for activating the secondary cell is determined based on the current state of the secondary cell and/or the secondary cell receiving capability of the terminal device.

Optionally, the current state of the to-be-activated secondary cell of the terminal device is at least one of the following: the cell is unknown, the cell is known, the cell is synchronized in time domain, the cell is not synchronized in time domain, the cell is synchronized in frequency domain, the cell is not synchronized in frequency domain, a receive panel of the cell is known, a receive panel of the cell is unknown, a transmit panel of the cell is known, a transmit panel of the cell is unknown, a receive beam of the cell is known, a receive beam of the cell is unknown, a transmit beam of the cell is known, a transmit beam of the cell is unknown, a CSI measurement result of the cell is known, or a CSI measurement result of the cell is unknown.

Optionally, the secondary cell receiving capability of the terminal device includes at least one of the following information: supporting wide beam receiving, not supporting wide beam receiving, a quantity of panels of the terminal device, a quantity of receive beams of the terminal device, a quantity of beams of a single panel of the terminal device, supporting scanning and receiving of a same synchronization signal block on different symbols by using different beams, or not supporting scanning and receiving of a same synchronization signal block on different symbols by using different beams.

All related content of the steps in the foregoing method embodiments may be cited in function descriptions of corresponding function modules or descriptions on the foregoing method side. Details are not described herein again.

In this embodiment, the communication apparatus 150 is presented in a form of function modules obtained through division in an integrated manner. The "module" herein may be a specific ASIC, a circuit, a processor that executes one or more software or firmware programs and a memory, an integrated logic circuit, and/or another component that can provide the foregoing functions. In a simple embodiment, a person skilled in the art may figure out that the communication apparatus 150 may be in a form of the network device 300 shown in FIG. 3.

For example, the processor 322 in the network device 300 shown in FIG. 3 may invoke the computer-executable instructions stored in the memory 321, to enable the network device 300 to perform the secondary cell activation method in the foregoing method embodiments.

The processor 322 in the network device 300 shown in FIG. 3 may invoke the computer-executable instructions stored in the memory 321, to implement functions/implementation processes of the processing module 1501 and the transceiver module 1502 in FIG. 15. Alternatively, the processor 322 in the network device 300 shown in FIG. 3 may invoke the computer-executable instructions stored in the memory 321, to implement functions/implementation processes of the processing module 1501 in FIG. 15, and the RRU 310 in the network device 300 shown in FIG. 3 may implement functions/implementation processes of the transceiver module 1502 in FIG. 15.

The communication apparatus provided in this embodiment may be configured to perform the foregoing secondary cell activation method. Therefore, for technical effects that can be achieved by the communication apparatus, refer to the foregoing method embodiments. Details are not described herein.

An embodiment of this application further provides a communication apparatus. The communication apparatus includes a processor and a memory. The memory is configured to store a program, and the processor invokes the program stored in the memory, to enable the communication apparatus to perform the secondary cell activation methods corresponding to the terminal device in FIG. 4 and FIG. 6 to FIG. 13.

An embodiment of this application further provides a communication apparatus. The communication apparatus includes a processor and a memory. The memory is configured to store a program, and the processor invokes the program stored in the memory, to enable the communication apparatus to perform the secondary cell activation methods corresponding to the network device in FIG. 4 and FIG. 6 to FIG. 13.

An embodiment of this application further provides a computer-readable storage medium. The computer-readable storage medium stores instructions. When the instructions are run on a computer or a processor, the computer or the processor is enabled to perform the secondary cell activation methods corresponding to the terminal device in FIG. 4 and FIG. 6 to FIG. 13, or perform the secondary cell activation methods corresponding to the network device in FIG. 4 and FIG. 6 to FIG. 13.

An embodiment of this application further provides a computer program product including instructions. When the instructions are run on a computer or a processor, the computer or the processor is enabled to perform the secondary cell activation methods corresponding to the terminal device in FIG. 4 and FIG. 6 to FIG. 13, or perform the secondary cell activation methods corresponding to the network device in FIG. 4 and FIG. 6 to FIG. 13.

An embodiment of this application provides a chip system. The chip system includes a processor, configured to support the communication apparatus in performing the secondary cell activation methods corresponding to the terminal device in FIG. 4 and FIG. 6 to FIG. 13. For example, the terminal device receives first indication information, where the first indication information is used to indicate an uplink resource for reporting a channel state information measurement result in a secondary cell activation phase. The terminal device sends the channel state information measurement result to a network device based on the first indication information.

For example, the chip system may be a field programmable gate array (FPGA), an application-specific integrated circuit (ASIC), a system on chip (SoC), a central processing unit (CPU), a network processor (NP), a digital signal processor (DSP), a micro controller (MCU), a programmable logic device (PLD), or another integrated chip.

In a possible design, the chip system further includes a memory. The memory is configured to store program instructions and data that are necessary for the terminal device. The chip system may include a chip and an integrated circuit, or may include a chip and another discrete device. This is not limited in this embodiment of this application.

An embodiment of this application provides a chip system. The chip system includes a processor, configured to support the communication apparatus in performing the secondary cell activation methods corresponding to the network device in FIG. 4 and FIG. 6 to FIG. 13. For example, the network device sends first indication information to a terminal device, where the first indication information is used to indicate an uplink resource for reporting a channel state information measurement result in a secondary cell activation phase. The network device receives the channel state information measurement result from the terminal device based on the first indication information.

For example, the chip system may be a field programmable gate array (FPGA), an application-specific integrated circuit (ASIC), a system on chip (SoC), a central processing unit (CPU), a network processor (NP), a digital signal processor (DSP), a micro controller (MCU), a programmable logic device (PLD), or another integrated chip.

In a possible design, the chip system further includes a memory. The memory is configured to store program instructions and data that are necessary for the network device. The chip system may include a chip and an integrated circuit, or may include a chip and another discrete device. This is not limited in this embodiment of this application.

The communication apparatuses, the computer storage medium, the computer program product, or the chip systems provided in this application are configured to perform the foregoing secondary cell activation methods. Therefore, for beneficial effects that can be achieved, refer to the beneficial effects in the implementations provided above. Details are not described herein again.

The memory in this embodiment of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. As an example instead of a limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, device, and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, function units in the embodiments of this application may be integrated into one processing unit, or each of the units may exist alone physically, or two or more units may be integrated into one unit.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A secondary cell activation method, comprising:
    receiving, by a terminal device, first indication information, wherein the first indication information indicates an uplink resource used for reporting a channel state information measurement result in a secondary cell activation phase;
    obtaining, by the terminal device, second indication information, wherein the second indication information indicates a pilot resource for channel state information measurement, and the pilot resource is a periodic resource, a semi-persistent resource, or a triggered resource; and
    sending, by the terminal device, the channel state information measurement result to a network device based on the first indication information.

2. The method according to claim 1, wherein the method further comprises:
    sending, by the terminal device, a request message to the network device, wherein the request message requests the first indication information.

3. The method according to claim 1, wherein the method further comprises:
sending, by the terminal device, third indication information to the network device, wherein the third indication information indicates a time period required for the terminal device to activate a secondary cell.

4. A secondary cell activation method, comprising:
sending, by a network device, first indication information to a terminal device, wherein the first indication information indicates an uplink resource for reporting a channel state information measurement result in a secondary cell activation phase;
sending, by the network device, second indication information to the terminal device, wherein the second indication information indicates a pilot resource used for channel state information measurement, and the pilot resource is a periodic resource, a semi-persistent resource, or a triggered resource; and
receiving, by the network device, the channel state information measurement result from the terminal device based on the first indication information.

5. The method according to claim 4, wherein the method further comprises:
receiving, by the network device, a request message from the terminal device, wherein the request message is used to request to obtain the first indication information.

6. The method according to claim 4, wherein the method further comprises:
receiving, by the network device, third indication information from the terminal device, wherein the third indication information indicates a time period required for the terminal device to activate a secondary cell.

7. A communication apparatus, comprising:
a transceiver, configured to receive first indication information and obtain second indication information, wherein the first indication information indicates an uplink resource for reporting a channel state information measurement result in a secondary cell activation phase, wherein the second indication information indicates a pilot resource used for channel state information measurement, and the pilot resource is a periodic resource, a semi-persistent resource, or a triggered resource, wherein
the transceiver is further configured to send the channel state information measurement result to a network device based on the first indication information.

8. The communication apparatus according to claim 7, wherein the transceiver is further configured to:
send a request message to the network device, wherein the request message requests the first indication information.

9. The communication apparatus according to claim 7, wherein the transceiver is further configured to:
send third indication information to the network device, wherein the third indication information indicates a time period required for the communication apparatus to activate a secondary cell.

10. A communication apparatus, comprising:
a transceiver, configured to send first indication information and second indication information to a terminal device, wherein the first indication information indicates an uplink resource for reporting a channel state information measurement result in a secondary cell activation phase, the second indication information indicates a pilot resource used for channel state information measurement, and the pilot resource is a periodic resource, a semi-persistent resource, or a triggered resource, and the transceiver is further configured to receive the channel state information measurement result from the terminal device based on the first indication information.

11. The communication apparatus according to claim 10, wherein the transceiver is further configured to:
receive a request message from the terminal device, wherein the request message is used to request to obtain the first indication information.

12. The communication apparatus according to claim 11, wherein an uplink resource carries the request message is an uplink resource of a primary cell or an uplink resource of a secondary cell.

13. The communication apparatus according to claim 11, wherein an uplink resource carries the request message comprises at least one of the following resources: a random access resource, a scheduling request resource, or a channel state information reporting resource of an another cell.

14. The communication apparatus according to claim 13, wherein the another cell is a primary cell or an activated secondary cell.

15. The communication apparatus according to claim 10, wherein the transceiver is further configured to:
receive third indication information from the terminal device, wherein the third indication information indicates a time period required for the terminal device to activate a secondary cell.

16. The communication apparatus according to claim 15, wherein the time period required for activating the secondary cell is based on a current state of the secondary cell or a secondary cell receiving capability of the terminal device.

* * * * *